United States Patent
Koo et al.

(10) Patent No.: US 12,075,521 B2
(45) Date of Patent: Aug. 27, 2024

(54) APPARATUS AND METHOD FOR MANAGING CONCURRENT ACTIVATION OF BUNDLE INSTALLED IN SMART SECURITY PLATFORM

(71) Applicant: Samsung Electronics Co., Ltd., Gyeonggi-do (KR)

(72) Inventors: Jonghoe Koo, Gyeonggi-do (KR); Duckey Lee, Gyeonggi-do (KR); Kangjin Yoon, Gyeonggi-do (KR); Hyewon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 425 days.

(21) Appl. No.: 17/274,584

(22) PCT Filed: Sep. 4, 2019

(86) PCT No.: PCT/KR2019/011419
§ 371 (c)(1),
(2) Date: Mar. 9, 2021

(87) PCT Pub. No.: WO2020/055034
PCT Pub. Date: Mar. 19, 2020

(65) Prior Publication Data
US 2022/0053029 A1    Feb. 17, 2022

(30) Foreign Application Priority Data
Sep. 13, 2018 (KR) .................. 10-2018-0109863

(51) Int. Cl.
*H04W 12/30* (2021.01)
*H04L 9/40* (2022.01)
(Continued)

(52) U.S. Cl.
CPC ............... *H04W 8/22* (2013.01); *H04L 12/12* (2013.01); *H04L 67/025* (2013.01); *H04L 67/51* (2022.05)

(58) Field of Classification Search
CPC ........ H04W 8/22; H04W 12/35; H04L 12/12; H04L 67/025; H04L 67/51; H04L 67/04; H04L 67/146; H04L 63/205
See application file for complete search history.

(56) References Cited

U.S. PATENT DOCUMENTS 9,009,475 B2   4/2015  Hauck et al.
9,049,723 B2   6/2015  Dhanda et al.
(Continued)

FOREIGN PATENT DOCUMENTS

CN    101218779    9/2011
CN    105518646    4/2016
(Continued)

OTHER PUBLICATIONS

Klaus Vedder, "Smart Secure Platform", ETSI Security Week 2018, Jun. 13, 2018, 9 pages.
(Continued)

*Primary Examiner* — Joseph E Dean, Jr.
(74) *Attorney, Agent, or Firm* — The Farrell Law Firm, P.C.

(57) ABSTRACT

The disclosure provides a method of managing a bundle installed in an SSP, the method including obtaining SSP setting information and determining a concurrent enabling limit value for each bundle family identifier based on the obtained SSP setting information.

16 Claims, 17 Drawing Sheets

| BUNDLE FAMILY IDENTIFIER | SSP SETTING VALUE ($N_{SSP}$) | LIMIT VALUE DETERMINATION POLICY | FINAL CONCURRENT ENABLING LIMIT VALUE ($N_{F.ID}$) |
|---|---|---|---|
| A — 811 | 1 — 821 | SSP SETTING PRIORITY — 831 | $N_{SSP}$ — 841 |
| B — 812 | 2 — 822 | SPB SETTING PRIORITY — 832 | $N_{Bun}$ — 842 |
| C — 813 | - — 823 | MINIMUM VALUE — 833 | $\min(N_{SSP}, N_{Bun})$ — 843 |
| Telecom — 814 | 2 — 824 | MINIMUM VALUE — 834 | $\min(N_{SSP}, N_{Bun})$ — 844 |

IN-SSP BUNDLE CONCURRENT ENABLING SETTING TABLE

(51) Int. Cl.
  *H04L 12/12* (2006.01)
  *H04L 67/025* (2022.01)
  *H04L 67/51* (2022.01)
  *H04W 8/22* (2009.01)

(56) References Cited

U.S. PATENT DOCUMENTS

| | | |
|---|---|---|
| 9,462,459 B2 | 10/2016 | Polson et al. |
| 10,117,091 B2 | 10/2018 | Wozniak et al. |
| 10,142,829 B2 | 11/2018 | Jin et al. |
| 10,341,845 B2 | 7/2019 | Park |
| 2007/0016782 A1 | 1/2007 | Crall et al. |
| 2008/0031135 A1 | 2/2008 | Pok et al. |
| 2011/0320608 A1 | 12/2011 | Nelakonda et al. |
| 2013/0310001 A1 | 11/2013 | Midkiff |
| 2014/0237101 A1 | 8/2014 | Park |
| 2014/0341184 A1* | 11/2014 | Dhanda ............... H04W 72/51 370/337 |
| 2015/0349826 A1 | 12/2015 | Li et al. |
| 2016/0088464 A1* | 3/2016 | Hans .................. H04W 8/183 455/558 |
| 2018/0249322 A1 | 8/2018 | Kim et al. |

FOREIGN PATENT DOCUMENTS

| | | |
|---|---|---|
| KR | 1020140086950 | 7/2014 |
| KR | 1020160005782 | 1/2016 |
| KR | 1020160032603 | 3/2016 |
| KR | 1020170055490 | 5/2017 |
| RU | 2 601 201 | 10/2016 |

OTHER PUBLICATIONS

Korean Office Action dated Sep. 6, 2022 issued in counterpart application No. 10-2018-0109863, 6 pages.
Indian Examination Report dated Nov. 4, 2022 issued in counterpart application No. 202137009973, 6 pages.
Chinese Office Action dated Oct. 9, 2023 issued in counterpart application No. 201980059721.0, 13 pages.
Russian Office Action dated Oct. 18, 2021 issued in counterpart application No. 2021109962/07, 7 pages.
European Search Report dated Aug. 19, 2021 issued in counterpart application No. 19859325.3-1213, 5 pages.
International Search Report dated Dec. 24, 2019 issued in counterpart application No. PCT/KR2019/011419, 19 pages.
Chinese Office Action dated Jun. 3, 2024 issued in counterpart application No. 201980059721.0, 4 pages.
European Search Report dated May 10, 2024 issued in counterpart application No. 19859325.3-1206, 6 pages.

* cited by examiner

FIG. 8

| BUNDLE FAMILY IDENTIFIER | SSP SETTING VALUE ($N_{SSP}$) | LIMIT VALUE DETERMINATION POLICY | FINAL CONCURRENT ENABLING LIMIT VALUE ($N_{F.ID}$) |
|---|---|---|---|
| A — 811 | 1 — 821 | SSP SETTING PRIORITY — 831 | $N_{SSP}$ — 841 |
| B — 812 | 2 — 822 | SPB SETTING PRIORITY — 832 | $N_{Bun}$ — 842 |
| C — 813 | - — 823 | MINIMUM VALUE — 833 | $\min(N_{SSP}, N_{Bun})$ — 843 |
| Telecom — 814 | 2 — 824 | MINIMUM VALUE — 834 | $\min(N_{SSP}, N_{Bun})$ — 844 |

IN-SSP BUNDLE CONCURRENT ENABLING SETTING TABLE

APPARATUS AND METHOD FOR MANAGING CONCURRENT ACTIVATION OF BUNDLE INSTALLED IN SMART SECURITY PLATFORM

PRIORITY

This application is a National Phase Entry of PCT International Application No. PCT/KR2019/011419, which was filed on Sep. 4, 2019, and claims priority to Korean Patent Application No. 10-2018-0109863, which was filed on Sep. 13, 2018, the entire content of each of which is incorporated herein by reference.

TECHNICAL FIELD

The disclosure relates to a method and apparatus for managing concurrent enabling of bundles installed in a smart security platform of a user equipment.

BACKGROUND ART

In order to meet demand with respect to wireless data traffic, which is explosively increasing due to the commercialization of the $4^{th}$ generation (4G) communication system, an improved $5^{th}$ generation (5G) communication system or pre-5G communication system has been developed. For this reason, the 5G communication system or the pre-5G communication system is called a beyond 4G network communication system or a post-long term evolution (LTE) system. The 5G communication system determined by the 3GPP is referred to as the new radio (NR) system. To achieve a high data rate, the implementation of the 5G communication system in an ultra-high-frequency (mmWave) band, for example, a 60 GHz band, has been considered. In order to mitigate the path loss of radio waves and increase the transmission distance of radio waves in the ultra-high frequency band, beamforming, massive MIMO, full dimensional MIMO (FD-MIMO), array antenna, analog beamforming, and large scale antenna techniques are being discussed in relation to the 5G communication system. Furthermore, for the improvement of a system network, in the 5G communication system, technologies such as advanced small cells, advanced small cells, a cloud radio access network (cloud RAN), an ultra-dense network, device to device communication (D2D), wireless backhaul, a moving network, cooperative communication, coordinated multi-points (COMP), reception interference cancellation, and the like, have been developed. In addition, in the 5G system, hybrid frequency shift keying and quadrature amplitude modulation (FOAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, are being developed.

The Internet is evolving from a human-centered connection network where humans generate and consume information, to an Internet of Things (IoT) network where information is exchanged and processed between distributed components such as things. Internet of Everything (IoE) technology, in which big data processing technology through a connection to a cloud server and the like is combined with the IoT technology, is also emerging. In order to implement the IoT, technical components such as sensing technology, wired/wireless communication and network infrastructure, service interface technology, and security technology are required. Recently, a sensor network, machine to machine (M2M) communication, machine type communication (MTC), and the like, for connection between things are being studied. In the IoT environment, intelligent Internet technology (IT) services that create new values in human life by collecting and analyzing data generated from connected things may be provided. The IoT may be applied to the fields of smart homes, smart buildings, smart cities, smart cars or connected cars, smart grids, health care, smart home appliances, advanced medical services, and the like, through fusion and convergence of existing information technology (IT) technology and various industries.

Accordingly, various attempts have been made to apply the 5G communication system to the IoT network. For example, technologies such as a sensor network, M2M communication, MTC, and the like, are being implemented by the 5G communication technologies such as beamforming, MIMO, array antennas, and the like. The use of the cloud RAN as the above-mentioned big data processing technology may be an example of the convergence of the 5G technology and the IoT technology. As described above and with the development of a mobile communication system, various services can be provided, and thus a method for effectively providing such services is required.

DESCRIPTION OF EMBODIMENTS

Technical Problem

Provided is an apparatus and method for effectively providing a service in a mobile communication system.

Solution to Problem

According to an embodiment of the disclosure, provided is a method of managing a bundle in a smart security platform to effectively provide a service in a mobile communication system.

Advantageous Effects of Disclosure

According to an embodiment of the disclosure, a service may be effectively provided in a mobile communication system.

BRIEF DESCRIPTION OF DRAWINGS

FIG. 8 is a view illustrating an SSP setting value for each bundle family identifier (SPB Family Identifier) set in an SSP, a limit value determination policy, and a final concurrent enabling limit value determined according to the limit value determination policy, according to an embodiment of the disclosure.

BEST MODE

Figure 1:
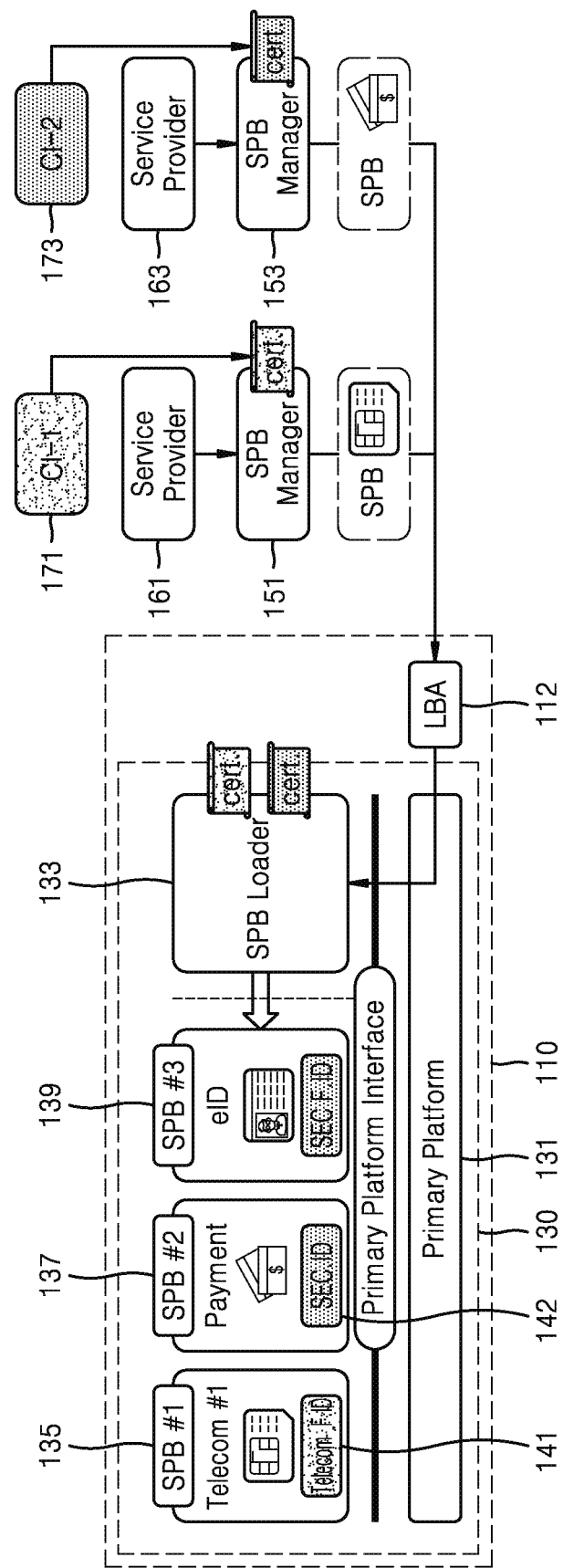
FIG. 1 is a view illustrating a process of installing a bundle in an SSP of a user equipment and describing constituent elements inside and outside the user equipment related to an installation type of the bundle, according to an embodiment of the disclosure.

According to an embodiment of the disclosure, a method of managing a bundle installed in a smart secure platform (SSP) may include obtaining SSP setting information, and determining a concurrent enabling limit value for each bundle family identifier based on the obtained SSP setting information.

The concurrent enabling limit value may be determined based on performance information of a user equipment.

The bundle family identifier may include a telecom bundle identifier.

The performance information of the user equipment may include at least one of antenna performance of a communication modem of the user equipment or performance of a cellular baseband.

The method may further include receiving a user input to request enabling of a target bundle, and determining a possibility of enabling of the target bundle based on the concurrent enabling limit value.

The method may further include enabling the target bundle when a number of currently enabled bundles is less than the concurrent enabling limit value.

The method may further include disabling at least one of the currently enabled bundles and enabling the target bundle, when a number of currently enabled bundles is greater than or equal to the concurrent enabling limit value.

The disabling of at least one of the currently enabled bundles may include receiving a user input to select at least one of the currently enabled bundles and disabling the at least one bundle selected based on the user input.

The method may further include:

obtaining bundle information in the SSP; and displaying at least one of a number of currently enabled bundles, a number of bundles available for additional enabling, or a number of bundles capable of being simultaneously enabled, based on bundle information and the SSP setting information in the SSP.

According to an embodiment of the disclosure, a user equipment for managing a bundle installed in a smart secure platform (SSP) may include a transceiver, and a controller coupled to the transceiver and configured to obtain SSP setting information and determine a concurrent enabling limit value for each bundle family identifier based on the obtained SSP setting information.

The concurrent enabling limit value may be determined based on performance information of the user equipment.

The bundle family identifier may include a telecom bundle identifier.

The performance information of the user equipment may include at least one of antenna performance of a communication modem of the user equipment or performance of a cellular baseband.

The controller may be further configured to receive a user input to request enabling of a target bundle, and determine a possibility of enabling of the target bundle based on the concurrent enabling limit value.

The controller may be further configured to enable the target bundle when a number of currently enabled bundles is less than the concurrent enabling limit value.

The controller may be further configured to disable at least one of currently enabled bundles and enable the target bundle, when a number of currently enabled bundles is greater than or equal to the concurrent enabling limit value.

The controller may be further configured to obtain bundle information in the SSP and display at least one of a number of currently enabled bundles, a number of bundles available for additional enabling, or a number of bundles capable of being simultaneously enabled, based on bundle information and the SSP setting information in the SSP.

Mode of Disclosure

Hereinafter, the embodiments of the disclosure are described in detail with reference to the accompanying drawings.

In the following description, descriptions on the technical contents that are well-known in the art to which the present disclosure pertains and are not directly related to the present disclosure are omitted functions or configurations will be omitted since they would unnecessarily obscure the subject matters of the disclosure. This is to prevent the unnecessary descriptions from obscuring the subject matters of the present disclosure and to further clearly describe the gist of the present disclosure.

For the same reason, each element illustrated in the drawings may be exaggerated, omitted, or schematically illustrated. Furthermore, the illustrated size of each element does not substantially reflect its actual size. In each drawing, like reference numerals denote like or corresponding elements.

Advantages and features of the disclosure and methods of accomplishing the same may be understood more readily by reference to the following detailed description of exemplary embodiments and the accompanying drawings. However, the disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that blocks of flowcharts and combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Accordingly, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card.

Specific terms used in the following description are provided to help the understanding of the disclosure, and the use of these specific terms may be changed into other forms within the scope not departing from the technical idea of the disclosure.

A secure element (SE) may mean a secure module composed of a single chip that can store secure information, e.g., a mobile communication network access key, user identification information such as an ID card/passport, credit card information, an encryption key, etc., and install therein and operate a control module that uses the stored secure information, e.g., a network access control module such as USIM, an encryption module, a key generation module, etc. The SE may be used for various electronic apparatuses, e.g., smartphones, tablets, wearable apparatuses, automobiles, IoT apparatuses, etc., and may provide a secure service, e.g., mobile communication network access, payment, user authentication, etc., through the secure information and the control module.

The SE may be divided into a universal integrated circuit card (UICC), an embedded secure element (eSE), and a smart secure platform (SSP), which is an integrated form of UICC and eSE, and also subdivided into a removable type and an embedded type depending on the type of connection or installation to an electronic apparatus, and an integrated type integrated into a specific device or a system-on-chip (SoC).

The UICC is a smart card that is inserted into and used in mobile communication user equipment, and is also called a UICC card. The UICC may include an access control module for accessing the network of a mobile communication service provider. Examples of the access control module may include a universal subscriber identity module (USIM), a subscriber identity module (SIM), an IP multimedia service identity module (ISIM), etc. The UICC including a USIM is typically called a USIM card. Likewise, the UICC including a SIM module is typically called a SIM card. The SIM module may be installed at the time of manufacturing the UICC, or the SIM module of the mobile communication service that the user wants to use may be downloaded to the UICC card whenever a user wants. A plurality of SIM modules may also be downloaded and installed in a UICC card and at least one SIM module may be selected from among the SIM modules for use. The UICC card may be fixed to a user equipment or not. The UICC used to be fixed to a user equipment is called an embedded UICC (eUICC), and particularly, the UICC included in a communication processor, an application processor, or an SoC having a single process structure incorporating the two processors, of a user equipment, may be referred to as an integrated UICC (iUICC). Typically, the eUICC and the iUICC may mean UICC cards that are used to be fixed to a user equipment and in which a SIM module is remotely downloaded and selected for use. In the disclosure, a UICC card in which a SIM module is remotely downloaded and selected for use is collectively referred to as the eUICC or iUICC. In other words, among the UICC cards in which a SIM module is remotely downloaded and selected for use, UICC cards that are fixed to a user equipment or nor are collectively referred to as the eUICC or iUICC. Furthermore, SIM module information that is downloadable is collectively referred to as a eUICC profile or an iUICC profile, or simply a profile.

The eSE means a fixed SE that is used to be fixed to an electronic apparatus. The eSE is usually manufactured exclusively for manufacturers at the request of user equipment manufacturers, and may be manufactured including an operating system and a framework. The eSE remotely downloads and installs a service control module in the form of an applet, and can be used for various secure services such as e-wallets, ticketing, e-passports, a digital keys, and the like. In the disclosure, the SE in the form of a single chip attached to an electronic apparatus that may remotely download and install a service control module is collectively referred to as the eSE.

A smart secure platform (SSP) is capable of supporting integrated functions of the UICC and the eSE on a single chip, and may be classified into a removable type (rSSP, Removable SSP), a fixed type (eSSP, Embedded SSP), and an integrated type integrated into the SoC (iSSP, Integrated SSP). The SSP may include one primary platform (PP, Primary Platform) and at least one secondary platform bundle (SPB, Secondary Platform Bundle) operating on the PP, and the primary platform may include at least one of a hardware platform and a low level operating system (LLOS) and the secondary platform bundle may include at least one of a high-level operating system (HLOS) and applications driven on the HLOS. The secondary platform bundle may be referred to as an SPB or a bundle. The bundle may access resources such as a central processing unit, a memory, and the like of the PP through a primary platform interface (PPI) provided by the PP and may be driven on the PP. The bundle may be equipped with communication applications such as SIM, USIM, ISIM, and various application applications such as e-wallets, ticketing, e-passports, a digital keys, and the like.

The SSP may be used for the above-described UICC or eSE depending on the bundle that is remotely downloaded and installed, and may install multiple bundles in a single SSP and simultaneously operate the installed bundles for a mixed use of UICC and eSE. In other words, when a bundle including a profile is operated, the SSP may be used for UICC to access the network of a mobile communication service provider. The UICC bundle may be operated, like eUICC or iUICC, by remotely downloading at least one profile into the bundle and selecting the same. Furthermore, the SSP may be used for the eSE purpose when a bundle including a service control module equipped with an applied application that provides services such as e-wallets, ticketing, e-passports, a digital keys, and the like is operated on the SSP. A plurality of service control modules may be integrally installed and operated in a single bundle, or may be installed and operated as an independent bundle.

Terms used in the disclosure are described below in detail.

In the disclosure, the SSP is a secure module in the form of a chip, which is capable of supporting the integrated functions of the UICC and the eSE in a single chip and may be classified into a removable type (rSSP, Removable SSP), a fixed type (eSSP, Embedded SSP), and an integrated type integrated into the SoC (iSSP, Integrated SSP). The SSP may download and install a bundle from an external bundle management server (Secondary Platform Bundle Manager, SPB Manager) by using an over-the-air (OTA) technology.

In the disclosure, the method of downloading and installing a bundle using the OTA technology in the SSP may be identically applied to a removable type SSP (rSSP) that can be inserted into and removed from a user equipment, a fixed type SSP (eSSP) installed in a user equipment, and an integrated type SSP (iSSP) included in an SoC installed in a user equipment.

In the disclosure, the term UICC may be interchangeably used with the SIM, and the term eUICC may be interchangeably used with the eSIM.

In the disclosure, the SPB is driven using the resource of the PP on the PP of the SSP, and for example, a UICC bundle may mean packaging, in the form of software, an application, a file system, an authentication key value, and the like stored in an existing UICC and an operating system (HLOS) for operating the same.

In the disclosure, the secondary platform bundle may be referred to as the bundle.

In the disclosure, a USIM profile may mean the same meaning as a profile or packaging, in the form of software, information included in a USIM application in a profile.

In the disclosure, the operation of enabling (enable) a bundle by a user equipment or external server may mean an operation of setting the user equipment to receive a service provided by the bundle, e.g., a communication service, a credit card payment service, a user authentication service, and the like through a communication service provider, by updating the state of the profile to an enabling state (enabled). The bundle in an enabling state may be expressed to be an "enabled bundle (enabled Bundle)". The bundle in an enabling state may be stored in a storage space inside or outside the SSP in an encryption state.

In the disclosure, the enabled bundle may be changed to an active state (driving state) according to an input from outside the bundle, e.g., an user input, a push, the requirements of an application in a user equipment, an authentication request of an communication service provider, a PP management message, and the like, or an operation inside the bundle, e.g., a timer, polling, and the like. The bundle in an active state may mean being loaded in a driving memory inside the SSP in a storage space inside or outside the SSP, processing secure information by using a secure control apparatus (Secure CPU) inside the SSP, and providing a user equipment with a secure service.

In the disclosure, an operation of disabling a bundle by a user equipment or external server may mean an operation of setting the user equipment to no longer receive a service provided by the bundle by updating the state of the bundle to a disabled state. The profile in a disabled state may be expressed to be a "disabled Bundle", The bundle in an enabling state may be stored in a storage space inside or outside the SSP in an encryption state.

In the disclosure, an operation of deleting a bundle by a user equipment or external server may mean an operation of setting the user equipment or external server not to enable or disable the bundle by updating the state of the bundle to a delete state (deleted). The bundle in a delete state may be expressed to be a "deleted bundle (deleted Bundle)".

The term "user equipment" used in the disclosure may be referred to as a mobile station (MS), a user equipment (UE; User Equipment), a user terminal (UT; User Terminal), a wireless terminal, an access terminal (AT), a terminal, a subscriber unit (Subscriber Unit), a subscriber station (SS; Subscriber Station), a wireless device (Wireless Device), a wireless communication device, a wireless transmit/receive unit (WTRU; Wireless Transmit/Receive Unit), a mobile node, a mobile, or other terms. Various embodiments of a user equipment may include cellular phones, smart phones having a wireless communication function, personal digital assistants (PDAs) having a wireless communication function, wireless modems, portable computers having a wireless communication function, photographing apparatuses such as digital cameras having a wireless communication function, gaming apparatuses having a wireless communication function, music storing and replaying home appliances having a wireless communication function, Internet home appliances capable of wireless Internet accessing and browsing, as well as portable units or user equipment integrated with combinations of functions. Furthermore, the user equipment may include a machine-to-machine (M2M) user equipment and a machine type communication (MTC) user equipment/device, the disclosure is not limited thereto. In the disclosure, the user equipment may be referred to as the electronic apparatus.

In the disclosure, the electronic apparatus may include an SSP capable of downloading and installing a bundle. When an SSP is not included in an electronic apparatus, the SSP physically separated from the electronic apparatus may be inserted into the electronic apparatus to be connected to thereto. For example, the SSP may be inserted into the electronic apparatus in the form of a card. The electronic apparatus may include a user equipment, and at this time, the user equipment may be a user equipment including an SSP capable of downloading and installing a bundle. The SSP may be not only included into a user equipment, but also inserted into a user equipment to be connected thereto when the SSP is separated from the user equipment.

In the disclosure, the user equipment or electronic apparatus may include software or application installed in the user equipment or electronic apparatus to control the SSP. The software or application may be referred to as, for example, a local bundle assistant (LBA) or a local bundle manager (LBM).

In the disclosure, a bundle separator may be referred to as the factor matching a bundle identifier (SPB ID), a bundle family identifier (SPB Family Identifier), a bundle matching ID, an event identifier (Event ID). The bundle identifier (SPB ID) may denote a unique identifier of each bundle. The bundle family identifier (SPB Family Identifier) may denote an identifier that classifies the type of a bundle, e.g., a telecom bundle to access the network of a mobile communication service provider. The bundle separator may be used as a value for indexing a bundle in a bundle management server. In the disclosure, the SSP identifier (SSP ID) may be a unique identifier of the SSP included in a user equipment and may be referred to as the sspID. Furthermore, as in an embodiment of the disclosure, when the user equipment and the SSP chip are not separated from each other, the SSP identifier (SSP ID) may be a user equipment ID. Furthermore, the SSP identifier (SSP ID) may refer to a specific bundle identifier (SPB ID) in the SSP. In detail, the SSP identifier (SSP ID) may refer to a bundle identifier of management bundle or a loader (SPBL, Secondary Platform Bundle Loader) that manages the installation, enabling, disabling, and deletion of other bundle(s) in the SSP. The SSP may have a plurality of SSP identifiers, and the SSP identifiers may be values derived from a unique single SSP identifier.

In the disclosure, the loader (SPBL, Secondary Platform Bundle Loader) may refer to a management bundle that manages the installation, enabling, disabling, and deletion of other bundle(s) in the SSP. The LBA of a user equipment or remote server may install, enable, disable, and delete a specific bundle through the loader. In the disclosure, the loader may be referred to as the SSP.

In the disclosure, an event (Event) may be a term collectively referring to instructions of bundle download (Bundle Download), remote bundle management (remote bundle management), or management/processing of other bundle(s) or SSP. The event (Event) may be called a remote bundle provisioning operation (Remote Bundle Provisioning Operation, or RBF operation, or RBP Operation) or an event record (Event Record), and each event (Event) may be referred to as the data including at least one of an event identifier (Event Identifier, Event ID, EventID) corresponding thereto or a matching identifier (Matching Identifier, Matching ID, MatchingID), an address of a bundle management server or opening mediation server where the event is stored (FQDN, IP Address, or URL), or each server identifier. The bundle download (Bundle Download) may be interchangeably used with a bundle installation (Bundle Installation). Furthermore, an event type (Event Type) may be used as a term referring to whether a specific event is a command of a bundle download, a remote bundle management, for example, deletion, enabling, disabling, replacement, update, and the like, or management/processing of other bundle(s) or SSP, and may be called an operation type (Operation Type or OperationType), an operation class (Operation Class or OperationClass), an event request type (Event Request Type), an event class (Event Class), an event request class (Event Request Class), and the like.

In the disclosure, a local bundle management (Local Bundle Management, LBM) may be called a bundle local management (Bundle Local Management), a local management (Local Management), a local management command (Local Management Command), a local command (Local Command), a local bundle management package (LBM Package), a bundle local management package (Bundle Local Management Package), a local management package (Local Management Package), a local management command package (Local Management Command Package), or a local command package (Local Command Package). The LBM may be used to change the state (Enabled, Disabled, Deleted) of a specific bundle or update the content of a specific bundle, for example, the nick name of a bundle (Bundle Nickname), or bundle summary information (Bundle Metadata), and the like, through software installed in a user equipment, and the like. The LBM may include one or more local management commands, and in this case, a bundle to be a target of each local management command may be the same or different for each local management command.

In the disclosure, a target bundle (target Bundle) may be used as a term indicating a bundle that is a target of a local management command or a remote management command.

In the disclosure, a service provider (Service Provider) may indicate a business entity that requests the generation of a bundle by issuing a request to a bundle management server, and provides services to a user equipment through the bundle. For example, the service provider may denote a communication service provider (Mobile Operator) that provides a communication network access service through a bundle with a communication application, and may collectively refer to all of a business supporting system (Business Supporting System, BSS), an operational supporting system (Operational Supporting System, OSS), a POS terminal (Point of Sale Terminal), and other IT systems of a communication service provider. Furthermore, in the disclosure, the service provider is not limited to expressing a specific business entity only, but may be used as a term referring to a group or coalition (association or consortium) of one or more business entities or a representative (representative) that represents the group or coalition. Furthermore, in the disclosure, the service provider may be called an operator (Operator or OP or Op.), a bundle owner (Bundle Owner, BO), an image owner (Image Owner, IO), and the like, and each service provider may be set or allocated with at least one name and/or a unique identifier (Object Identifier, OID). If the service provider refers to a group or coalition or a representative of one or more business entities, the name or unique identifier of a certain group or coalition or a representative may be a name or unique identifier commonly shared by all business entities belonging to the group or coalition or all business entities cooperating with the representative.

In the disclosure, the NAA may be a network access application (Network Access Application) application program, and may be the same application program as the USIM or ISIM stored in the UICC to access a network. The NAA may be a network access module.

In the disclosure, the telecom bundle may be equipped with at least one NAA, or may be a bundle with a function capable of remotely downloading and installing at least one NAA. In the disclosure, the telecom bundle may include a telecom bundle identifier referring to the same.

In the disclosure, a bundle concurrent enabling limit value (Bundle Concurrent Enabling Limit) may be a parameter that is set in a secondary platform bundle (Secondary Platform Bundle) to limit the number of the secondary platform bundles (Secondary Platform Bundle) having the same bundle family identifier (SPB Family Identifier) as the secondary platform bundle (Secondary Platform Bundle) between the enabled bundle (enabled Bundle) and a driving bundle (active bundle) in a user equipment. The bundle concurrent enabling limit value (Bundle Concurrent Enabling Limit) may be set by the bundle management server at the generation of a bundle. The bundle management server may be expressed to be at least one of a service provider (Service Provider), a bundle provisioner (Bundle Provisioner, BP), or a bundle provider (Bundle Provider). The bundle concurrent enabling limit value (Bundle Concurrent Enabling Limit) may be included in a specific field value in a bundle and downloaded to a user equipment, or included in information such as a certificate or metadata of a bundle, which are downloaded with a bundle, and transmitted to the user equipment. The user equipment may store, after bundle downloading, the bundle concurrent enabling limit value (Bundle Concurrent Enabling Limit) in a bundle or in a memory that is managed by the bundle.

In the disclosure, a minimum bundle concurrent enabling limit value (Minimum Concurrent Enabling Limit) may be set for each bundle family identifier (SPB Family Identifier). The minimum bundle concurrent enabling limit value (Minimum Concurrent Enabling Limit) of a specific bundle family identifier (Bundle Family Identifier) may be set to be a minimum value of the bundle concurrent enabling limit value (Bundle Concurrent Enabling Limit) set in a bundle in the enabling state (Enabled) or the active state (driving state) and having a specific bundle family identifier (Bundle Family Identifier) among the secondary platform bundle (Secondary Platform Bundle) installed in a user equipment.

In the disclosure, a concurrent enabling limit value (Platform Concurrent Enabling Limit) may be a parameter that is set in the SSP of a user equipment user equipment and limits the number of the secondary platform bundles (Secondary Platform Bundle) having a specific bundle family identifier (SPB Family Identifier) between the enabled bundle (enabled bundle) and the driving bundle (active bundle). The concurrent enabling limit value (Platform Concurrent Enabling Limit) may be set to be a different value for each bundle family identifier (SPB Family Identifier). The concurrent enabling limit value (Platform Concurrent Enabling Limit) may be set in a memory or a registry managed by the SPBL (Secondary Platform Bundle Loader) of the SSP in a user equipment.

In the disclosure, an SSP setting value may be used in the same meaning as the concurrent enabling limit value (Platform Concurrent Enabling Limit).

In the disclosure, a final concurrent enabling limit value (Final Concurrent Enabling Limit) may be used to limit the sum of the numbers of the enabled bundles (enabled bundle) and the driving bundles (active bundle) having a specific bundle family identifier (SPB Family Identifier) in a user equipment. The final concurrent enabling limit value (Final Concurrent Enabling Limit) may be set to be the minimum bundle concurrent enabling limit value (Minimum Bundle Concurrent Enabling Limit) or the concurrent enabling limit value (Platform Concurrent Enabling Limit) of the bundle family identifier (SPB Family Identifier), or to be a smaller value between the minimum bundle concurrent enabling limit value (Minimum Bundle Concurrent Enabling Limit) and the concurrent enabling limit value (Platform Concurrent Enabling Limit), according to the setting in a user equipment.

In the disclosure, a limit value determination policy may be used to specify a method of determining the final concurrent enabling limit value (Final Concurrent Enabling Limit) of a specific bundle family identifier (SPB Family Identifier).

In the disclosure, the limit value determination policy may include a method of setting the final concurrent enabling limit value (Final Concurrent Enabling Limit) of a specific bundle family identifier (SPB Family Identifier) to the minimum bundle concurrent enabling limit value (Minimum Bundle Concurrent Enabling Limit) of the bundle family identifier (SPB Family Identifier), to reflect the requirements of a bundle provider or a bundle supplier.

In the disclosure, the limit value determination policy may include a method of determining the final concurrent enabling limit value (Final Concurrent Enabling Limit) of a specific bundle family identifier (SPB Family Identifier) to be the concurrent enabling limit value (Platform Concurrent Enabling Limit) of the bundle family identifier (SPB Family Identifier) to reflect the requirements of a user equipment manufacturer or an SSP manufacturer.

In the disclosure, the limit value determination policy may include a method of determining a smaller value between the minimum bundle concurrent enabling limit value (Minimum Bundle Concurrent Enabling Limit) and the concurrent enabling limit value (Platform Concurrent Enabling Limit) of the bundle family identifier (SPB Family Identifier) to be the final concurrent enabling limit value (Final Concurrent Enabling Limit) of a specific bundle family identifier (SPB Family Identifier).

In the disclosure, a platform bundle concurrent enabling setting (Platform Bundle Concurrent Enabling Setting) may include a method of setting the SSP setting value and the limit value determination policy for each bundle family identifier (SPB Family Identifier) in a user equipment. The platform bundle concurrent enabling setting (Platform Bundle Concurrent Enabling Setting) may be set in a memory area or registry in the SSP in a user equipment. The platform bundle concurrent enabling setting (Platform Bundle Concurrent Enabling Setting) may be set in a data and memory area or registry managed by the SPBL. The platform bundle concurrent enabling setting (Platform Bundle Concurrent Enabling Setting) may be set in the LBA.

In the disclosure, the in-SSP bundle concurrent enabling setting table may mean the SSP setting value and the limit value determination policy value for each bundle family identifier (SPB Family Identifier) set by the platform bundle concurrent enabling setting (Platform Bundle Concurrent Enabling Setting).

In the description of the disclosure, when a detailed description of a related known function or configuration is determined to unnecessarily obscure the subject matter of the disclosure, the description is omitted.

Hereinafter, a bundle installed in a user equipment is described through various embodiments regarding a method and apparatus for managing concurrent enabling of bundles for each bundle family identifier. In detail, the disclosed embodiments may provide an apparatus and method of capable of managing concurrent enabling of bundles that provides a secure service, e.g., mobile communication network access, payment, user authentication, a digital key, and the like, installed in a secure module installed on an electronic apparatus.

FIG. 1 is a view illustrating constituent elements inside and outside the user equipment 110 for downloading and installing a bundle in an SSP 130 by the user equipment 110, according to an embodiment of the disclosure.

In FIG. 1, the user equipment 110 may be a user equipment in which the SSP 130 is installed and a LBA 112 for controlling the SSP 130 is installed. The SSP 130 may be included in the user equipment 110 or a removable type. The SSP 130 may include a primary platform 131, a SPBL 133, and one or more secondary platform bundles 135, 137, and 139. Furthermore, the secondary platform bundles 135, 137, and 139 may not be installed in the SSP 130 at the time of shipment of a user equipment, and may be remotely downloaded and installed after the shipment.

Furthermore, referring to FIG. 1, each bundle may have bundle family identifiers 141 and 142 different from each other. The SSP 130 or an SPBL 133 may store and manage certificate information to be used when downloading and installing bundles to which family identifiers different from each other are assigned. At this time, the certificate information that is classified and managed for each family identifier may exist on certificate hierarchy issued by certificate issuers (Certificate Issuer, CI) different from each other. When a bundle is downloaded and installed from a bundle management server 151 or 153, the SSP 130 or the SPBL 133 may select the certificate information set in the bundle family identifier assigned to the bundle and transmit the information to a bundle management server 151 or 153. The certificate information may be a certificate or public key (Public Key) of the certificate issuer (Certificate Issuer, CI) of the certificate hierarchy, and may be an identifier, e.g., CI ID, CI ID, CI Object ID, Object Universally Unique Identifier, Object UUID, CI Public Key ID) corresponding to the certificate and public key.

Figure 2:
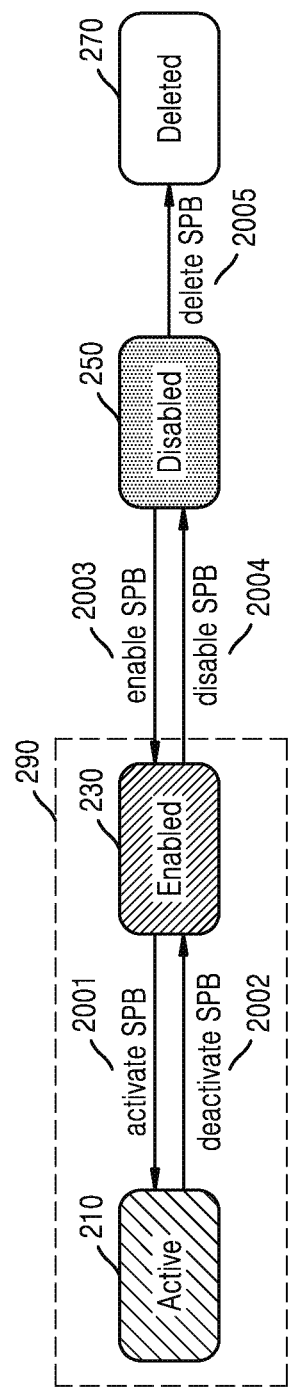
FIG. 2 is a view illustrating a bundle state (SPB state) and a bundle state transition (SPB state transition) of a secondary platform bundle (SPB, bundle), according to an embodiment of the disclosure.

FIG. 2 is a view illustrating a bundle state (SPB state) and a bundle state transition (SPB state transition) of a secondary platform bundle (SPB, bundle), according to an embodiment of the disclosure.

In FIG. 2, a bundle may have one of four state, that is, an active state (driving state) 210, an enabling state (Enabled) 230, a disabled state (disabled) 250, and a delete state (deleted) 270. A bundle in the enabling state (enable) 230 and the disabled state (disabled) 250 may be called a secondary platform bundle container (secondary platform bundle container). A bundle in the active state 210 may be called a secondary platform bundle instance (secondary platform bundle instance). In the disclosure, a state 290 considered for concurrent enabling may include in the active state 210 and the enabling state (Enabled) 230. In other words, a bundle considered for concurrent enabling may include the enabled bundle (enabled bundle) and the driven bundle (active Bundle).

The enabled bundle may be switched to the bundle in an active state under the control of a user equipment (or LBA included in user equipment), and the bundle in an active state may be further included in a bundle in the enabling state. In other words, considering the number of concurrently enabled bundles, a user equipment may consider both of the bundle in an active state and the bundle in an enabling state. Furthermore, considering the number of concurrently enabled bundle, only the number of bundles in the enabling state (Enabled) 230 may be taken into consideration, which is the same as the above-described content.

In FIG. 2, a driving operation 2001 may mean a state transition operation of updating a bundle state from the enabling state (Enabled) 230 to the active state 210. The driving operation 2001 may be updated to the active state according to a bundle outside input, e.g., a user input, a push, a request of an application in a user equipment, an authentication request of a communication service provider, a PP management message, and the like, or a bundle inside operation, e.g., timer or Polling. The bundle in an active state may be loaded from a storage space inside or outside the SSP on a driving memory in the SSP, and after secure information is processed by using a secure control apparatus (Secure CPU) in the SSP, a secure service is provided to the user equipment.

In FIG. 2, a driving stopping operation 2002 may mean a state transition operation of updating a bundle state from the active state 210 to the enabling state (Enabled) 230.

In FIG. 2, an enabling operation 2003 may mean a state transition operation of updating a bundle state from the disabled state (disabled) 250 to the enabling state (Enabled) 230. The enabling operation 2003 may update the state of the bundle from the disabled state (disabled) 250 to the enabling state (Enabled) 230 so that a user equipment may receive a service provided by the bundle, e.g., a communication service, a credit card payment service, a user authentication service, and the like through a communication service provider. A bundle in the enabling state (Enabled) 230 may be expressed to be an "enabled bundle (enabled Bundle)" The bundle in an enabling state may be stored in a storage space inside or outside the SSP in an encryption state.

In FIG. 2, a disabling operation 2004 may mean a state transition operation of updating a bundle state from the enabling state (Enabled) 230 to the disabled state (disabled) 250 so that a user equipment may not receive a service provided by the bundle.

In FIG. 2, a deleting operation 2005 may mean a state transition operation of updating a bundle state to a delete state (deleted) 270 so that a user equipment or external server no longer enable or disable the bundle. A bundle in the delete state (deleted) 270 may be expressed to be a "deleted bundle (deleted Bundle)".

Figure 3:
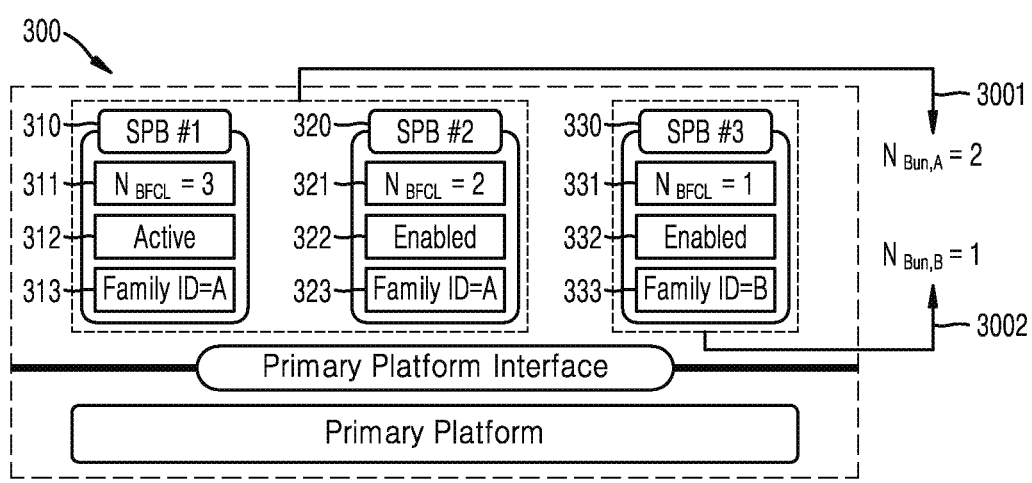
FIG. 3 is a view illustrating a process of setting a minimum bundle concurrent enabling limit value for each bundle family identifier (SPB Family Identifier) based on a bundle concurrent enabling limit value set in a bundle installed in an SSP of a user equipment, according to an embodiment of the disclosure.

FIG. 3 is a view illustrating a process of setting a minimum bundle concurrent enabling limit value for each bundle family identifier (SPB Family Identifier) based on a bundle concurrent enabling limit value set in a bundle installed in an SSP of a user equipment, according to an embodiment of the disclosure.

Referring to FIG. 3, bundle concurrent enabling limit values NBFCL 311, 321, and 331, bundle states 312, 322, and 332, bundle family identifiers (Bundle Family Identifier) 313, 323, and 333 may be set in secondary platform bundles 310, 320, and 330 installed in an SSP 300. The bundle concurrent enabling limit values NBFCL 311, 321, and 331, the bundle states 312, 322, and 332, and bundle family identifiers 313, 323, and 333 may be set by a Service Provider that provides a bundle before the bundle is installed in the SSP 300. The bundle concurrent enabling limit values $N_{BFCL}$ 311, 321, and 331, the bundle states 312, 322, and 332, and the bundle family identifiers 313, 323, and 333 may be set in a registry for bundle management in the SSP 300 after the bundle is installed in the SSP 300. Furthermore, the bundle concurrent enabling limit value, the bundle state, and the bundle family identifier may be managed in data managed by the SPBL. Furthermore, the bundle concurrent enabling limit value, the bundle state, and the bundle family identifier, by being included as a part of metadata of a bundle, may be transmitted to a user or SSP management server through the LBA.

Referring to FIG. 3, in operation 3001, a minimum bundle concurrent enabling limit value $N_{Bun,A}$ of a bundle family identifier A may be determined by bundles 310 and 320 having the bundle family identifier A among bundles installed in the SSP. The operation 3001 may shows an example in which the minimum bundle concurrent enabling limit value $N_{Bun,A}$ of bundle family identifier A is determined to be 2 that is a minimum value between the minimum values of the bundle concurrent enabling limit values 311 and 321 set in the bundles 310 and 320 installed in the SSP 300 in an enabling state and having the bundle family identifier of A. Operation 3002 shows an example in which the minimum bundle concurrent enabling limit value $N_{Bun,B}$ of a bundle family identifier B is determined to be 1 by a bundle concurrent enabling limit value 333 set in the bundle 330 installed in the SSP 300 in an enabling state and having the bundle family identifier of B.

Figure 4:
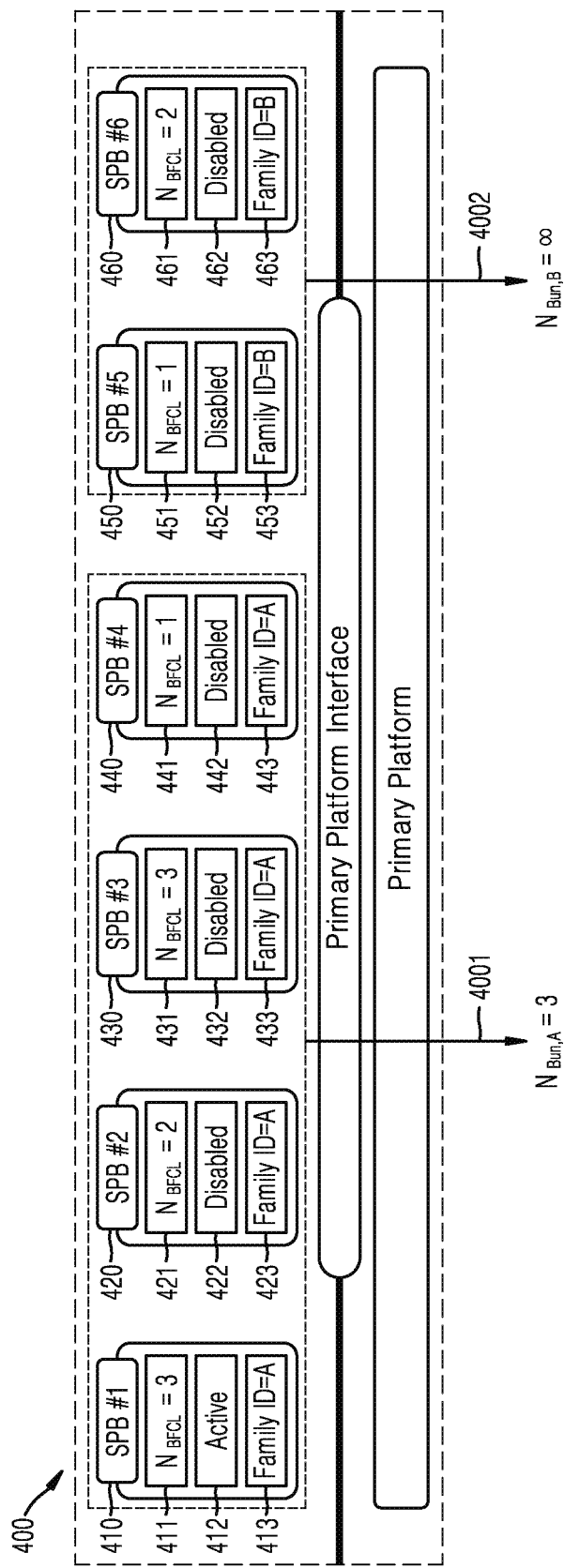
FIG. 4 is a view illustrating a bundle limit value, a state (SPB state), and a bundle family identifier (SPB Family Identifier) set in a bundle installed in an SSP of a user equipment, and a state in which one bundle is enabled on an SSP, according to an embodiment of the disclosure.

FIG. 4 is a view illustrating a bundle limit value, a state (SPB state), and a bundle family identifier (SPB Family Identifier) set in a bundle installed in an SSP of a user equipment, and a state in which one bundle is enabled on an SSP, according to an embodiment of the disclosure.

FIG. 4 illustrates an example in which bundles 410, 420, 430, and 440 installed in an SSP 400 and having the bundle family identifier A determines the minimum bundle concurrent enabling limit value $N_{Bun,A}$ of the bundle family identifier A. Among the bundle 410, 420, 430, and 440 installed in the SSP 400 and having the bundle family identifier A, a bundle corresponding to a state to be considered for concurrent enabling may include a bundle object 1 410 that is in an active state. Operation 4001 shows an example in which the minimum bundle concurrent enabling limit value $N_{Bun,A}$ of the bundle family identifier A is determined by the bundle object 1 410 to be 3. FIG. 4 illustrates an example in which the bundle concurrent enabling limit values 421, 431, 441 set by the bundles 420, 430, and 440 in a disabled state among the bundles having the bundle family identifier A do not affect the minimum bundle concurrent enabling limit value $N_{Bun,A}$ of the bundle family identifier A.

Furthermore, FIG. 4 shows an example in which the minimum bundle concurrent enabling limit value $N_{Bun,B}$ of the bundle family identifier B is determined by the bundles 450 and 460 installed in the SSP 400 and having the bundle family identifier B, FIG. 4 illustrates an example in which no bundle corresponding to a state to be considered for concurrent enabling exists in the bundles 450 and 460 installed in the SSP 400 and having the bundle family identifier B. Operation 4002 shows an example in which the minimum bundle concurrent enabling limit value $N_{Bun,B}$ of the bundle family identifier B is determined to be infinity ($\infty$) because no bundle in a state to be considered for concurrent enabling exists in the bundles installed in the SSP 400 and having the bundle family identifier B.

Figure 5:
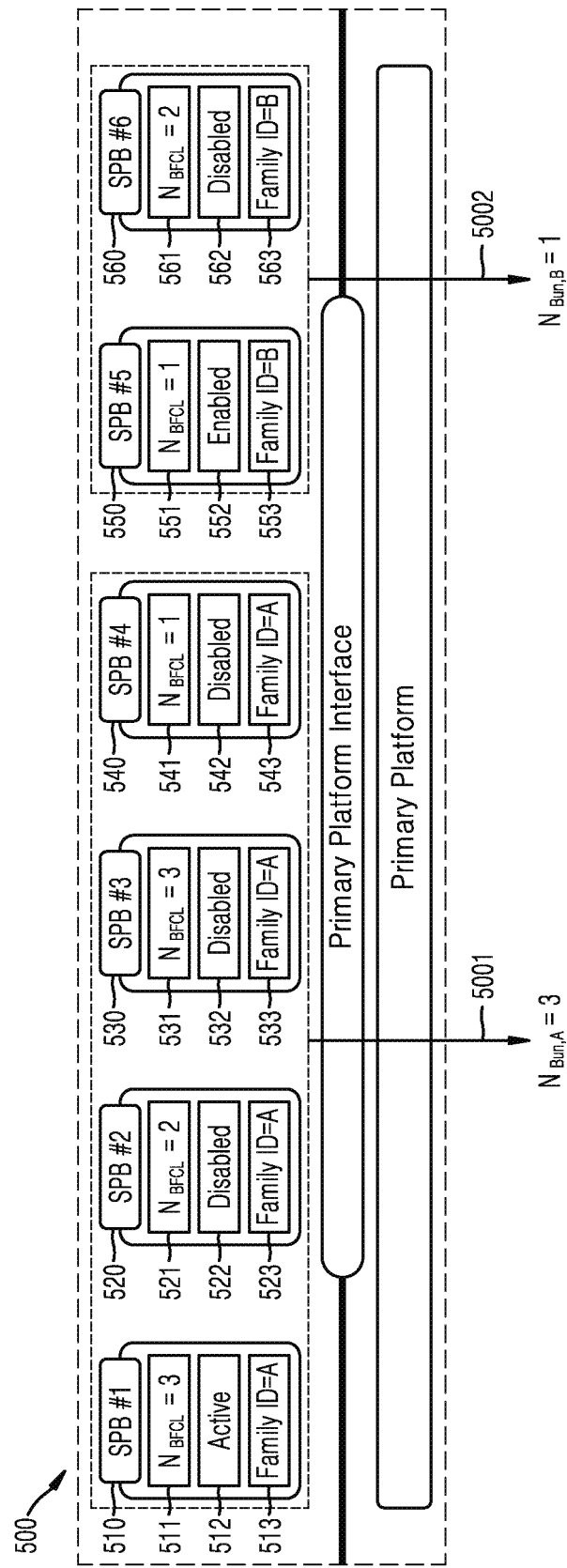
FIG. 5 is a view illustrating a bundle concurrent enabling limit value set in a bundle installed in an SSP of a user equipment, a state (SPB state), and a bundle family identifier (SPB Family Identifier), and a state in which two bundles having bundle family identifiers (SPB Family Identifiers) different from each other are enabled, according to an embodiment of the disclosure.

FIG. 5 is a view illustrating a bundle concurrent enabling limit value set in a bundle installed in an SSP of a user equipment, a state (SPB state), and a bundle family identifier (SPB Family Identifier), and a state in which two bundles having bundle family identifiers (SPB Family Identifiers) different from each other are enabled, according to an embodiment of the disclosure.

FIG. 5 illustrates an example in which the minimum bundle concurrent enabling limit value $N_{Bun,B}$ of a bundle having the bundle family identifier B is determined by bundles 550 and 560 installed in the SSP 400 and having the bundle family identifier B. Among the bundles 550 and 560 installed in the SSP 500 of FIG. 5 and having the bundle family identifier B, a bundle corresponding to a state to be considered for concurrent enabling may include a bundle object 5 550 that is in an enabling state. Operation 5002 shows an example in which the minimum bundle concurrent enabling limit value $N_{Bun,B}$ of the bundle family identifier B determined to be 1 by a bundle concurrent enabling limit value 551 set by the bundle object 5 550.

FIG. 5 illustrates an example in which bundle concurrent enabling limit values 511, 521, 531, and 541 set in the bundles 510, 520, 530, and 540 having the bundle family identifier A do not affect the minimum bundle concurrent enabling limit value $N_{Bun,B}$ bundle family identifier B. Furthermore, FIG. 5 shows an example in which the bundle concurrent enabling limit values 551 and 561 set in the bundles 550 and 560 having the bundle family identifier B do not affect the minimum bundle concurrent enabling limit value $N_{Bun,A}$ of the bundle family identifier A FIG. 6 is a view illustrating a bundle concurrent enabling limit value set in a bundle installed in an SSP of a user equipment, a state (SPB state), and a bundle family identifier (SPB Family Identifier), and a state in which two or more bundles are concurrently enabled in a bundle of a specific bundle family identifier (SPB Family Identifier), according to an embodiment of the disclosure.

Figure 6:
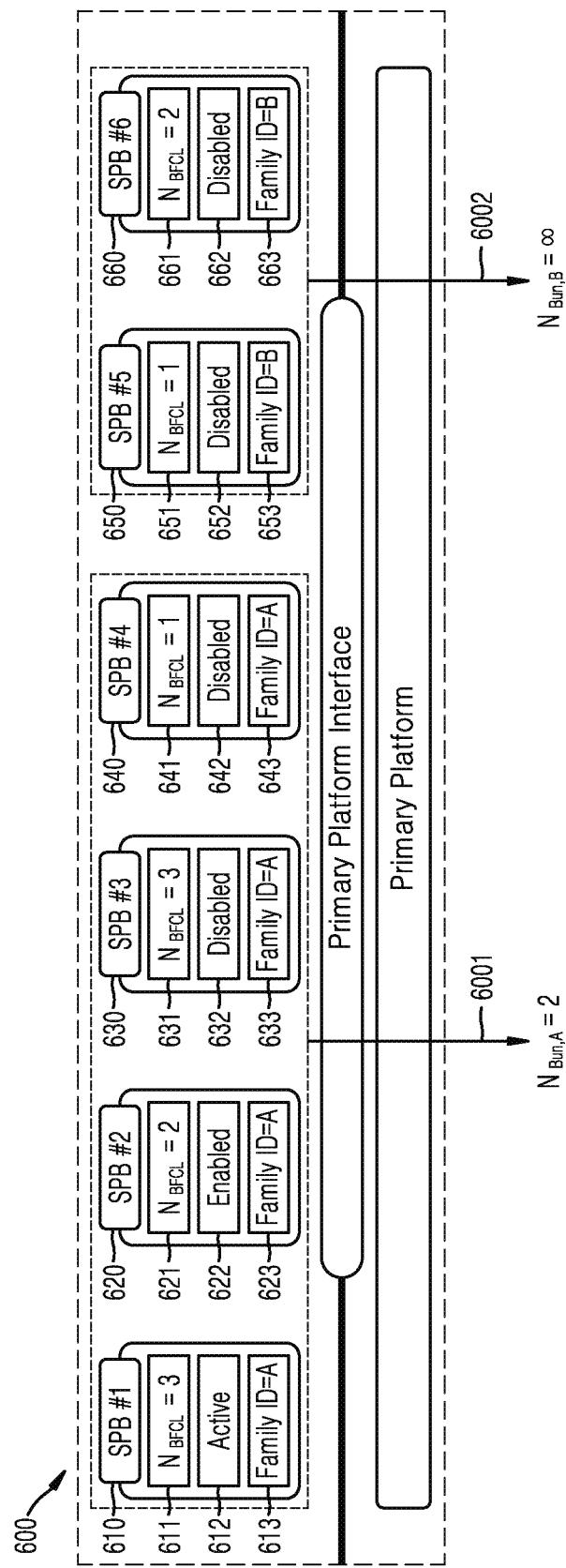
FIG. 6 is a view illustrating a bundle concurrent enabling limit value set in a bundle installed in an SSP of a user equipment, a state (SPB state), and a bundle family identifier (SPB Family Identifier), and a state in which two or more bundles are concurrently enabled in a bundle of a specific bundle family identifier (SPB Family Identifier), according to an embodiment of the disclosure.

FIG. 6 illustrates an example in which the minimum bundle concurrent enabling limit value $N_{Bun,A}$ of the bundle family identifier A is determined by bundles 610, 620, 630, and 640 installed in an SSP 600 and having the bundle family identifier A. Among the bundles 610, 620, 630, and 640 installed in the SSP 600 of FIG. 6 and having the bundle family identifier A, a bundle corresponding to a state to be considered for concurrent enabling may include a bundle object 1 610 in an active state and a bundle object 2 620 in an enabling state. Operation 6001 shows an example in which the minimum bundle concurrent enabling limit value $N_{Bun,A}$ of the bundle family identifier A is determined to be 2 that is a smaller value between the bundle concurrent enabling limit values 611 and 621 set by the bundle object 1 610 and the bundle object 2 620.

Furthermore, FIG. 6 illustrates an example in which bundle concurrent enabling limit values 631 and 641 set by the bundles 630 and 640 in a disabled state among the bundles having the bundle family identifier A does not affect the minimum bundle concurrent enabling limit value $N_{Bun,A}$ of the bundle family identifier A.

Furthermore, FIG. 6 shows an example in which there is no bundle corresponding to a state to be considered for concurrent enabling in the bundles 450 and 460 installed in the SSP 400 and having the bundle family identifier B. Operation 6002 shows an example in which the minimum bundle concurrent enabling limit value $N_{Bun,B}$ of the bundle family identifier B is determined to be infinity ($\infty$) because there is no bundle in a state to be considered for concurrent enabling in the bundles installed in the SSP 600 and having the bundle family identifier B.

Figure 7:
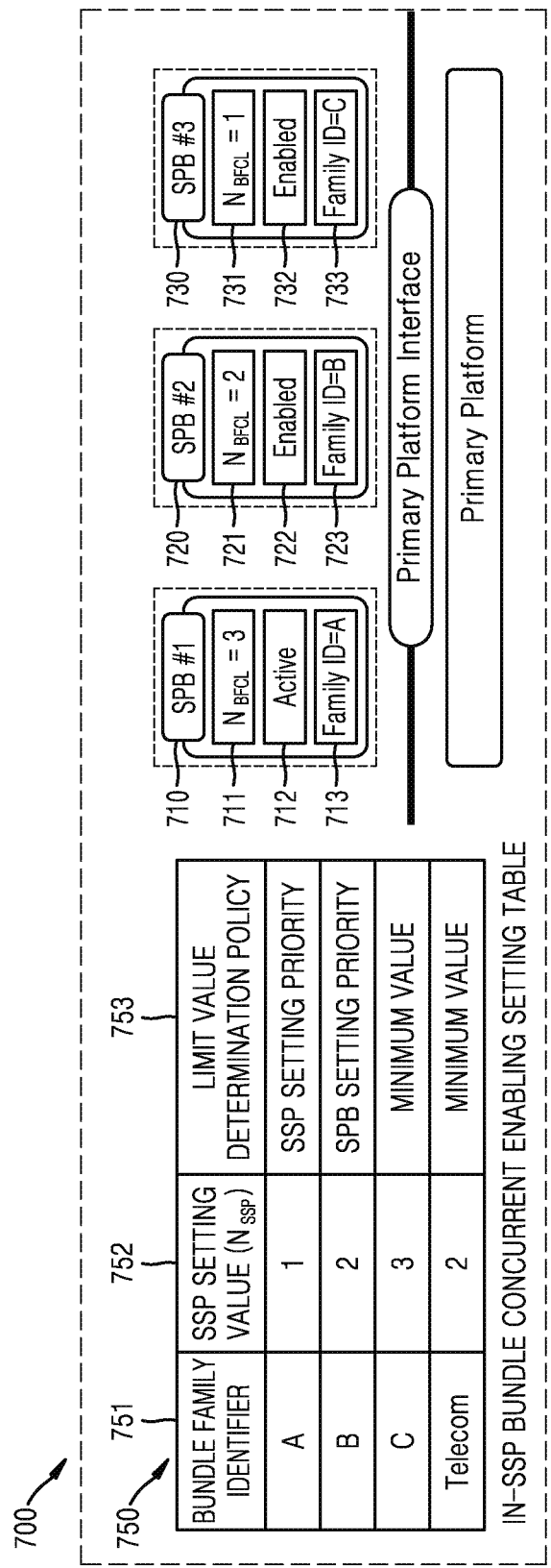
FIG. 7 is a view illustrating a bundle concurrent enabling limit value set in a bundle installed in an SSP of a user equipment, a state (SPB state), and a bundle family identifier (SPB Family Identifier), and describing an SSP setting value for each bundle family identifier (SPB Family Identifier) set in the SSP, and a limit value determination policy, according to an embodiment of the disclosure.

FIG. 7 is a view illustrating a bundle concurrent enabling limit value set in a bundle installed in an SSP of a user equipment, a state (SPB state), and a bundle family identifier (SPB Family Identifier), and describing an SSP setting value for each bundle family identifier (SPB Family Identifier) set in the SSP, and a limit value determination policy, according to an embodiment of the disclosure.

According to FIG. 7, to limit restrict concurrent enabling of secondary platform bundles 710, 720, and 730 installed in an SSP 700, an in-SSP bundle concurrent enabling setting table 750 may be set in the SSP 700. The value managed in the in-SSP bundle concurrent enabling setting table 750 may include a bundle family identifier 751, an SSP setting value 752, and a limit value determination policy 753. The SSP setting value 752 and the limit value determination policy 753 may be set for the bundle family identifier 751. The SSP setting value 752 is an SSP concurrent enabling limit value of a corresponding bundle family identifier. The limit value determination policy 753 may specify a policy to determine a final concurrent enabling limit value with respect to a corresponding bundle family identifier. The limit value determination policy 753 may set to an "SSP setting priority" in which the final concurrent enabling limit value is set to the SSP setting value 752, Furthermore, the limit value determination policy 753 may set the final concurrent enabling limit value to be a minimum bundle concurrent enabling limit value. Furthermore, the limit value determination policy 753 may be set to a "minimum value" to set the final concurrent enabling limit value to be a minimum value between the SSP setting value 752 and the bundle concurrent enabling limit value.

FIG. 7 shows an example in which, when a bundle family identifier 713 of a bundle object 1 710 is 1, the SSP setting value 752 is 1 when the bundle family identifier 751 of the in-SSP bundle concurrent enabling setting table 750 is A, and "SSP setting priority" that is the limit value determination policy 753 is set, the final concurrent enabling limit value of the bundle family identifier A is determined to be 1 that is an SSP setting value.

FIG. 7 shows an example in which, when a bundle family identifier 723 of a bundle object 2 720 is 2, the SSP setting value 752 is 2 when the bundle family identifier 751 of the in-SSP bundle concurrent enabling setting table 750 is B, and "SSP setting priority" that is the limit value determination policy 753 is set, the final concurrent enabling limit value of the bundle family identifier B is determined to be 2 that is an SSP setting value. The SSP setting value 752 may be a value set in the SSP that is a value regarding the maximum number of a bundle capable of concurrent enabling. The SSP setting value 752 may be set for each bundle family identifier.

FIG. 7 shows an example in which, when a bundle family identifier 733 of a bundle object 2 730 is 3, the SSP setting value 752 is 3 when the bundle family identifier 751 of the in-SSP bundle concurrent enabling setting table 750 is C, and "SSP setting priority" that is the limit value determination policy 753 is set, the final concurrent enabling limit value of the bundle family identifier C is determined to be 1 that is a minimum value between 3 that is the SSP setting value corresponding to the bundle family identifier C and 1 that is the minimum bundle concurrent enabling limit value 731.

The disclosure is not limited to the above examples, and a user equipment may always follow the SSP setting value 752 or the bundle concurrent enabling limit value 711, 721, or 731 for each bundle family.

FIG. 8 is a view illustrating an SSP setting value for each bundle family identifier (SPB Family Identifier) set in an SSP, a limit value determination policy, and a final concurrent enabling limit value determined according to the limit value determination policy, according to an embodiment of the disclosure.

An in-SSP bundle concurrent enabling setting table 800 of FIG. 8 may include a bundle family identifier 810, an SSP setting value 820, a limit value determination policy 830, and a final concurrent enabling limit value 840.

According to FIG. 8, the SSP setting value 820, the limit value determination policy 830, and the final concurrent enabling limit value 840 may have a value for each specific the bundle family identifier 810 to be managed.

SSP setting values 821, 822, and 824 may have a natural number value and a value may not be set like an SSP setting value 823. The SSP setting value 823 with no set value may have an effect like infinity.

The limit value determination policy 830 may include an SSP setting priority 831, an SPB setting priority 832, and minimum values 833 and 834. The SSP setting priority 831 policy may include a method of determining a final concurrent enabling limit value 841 to be the SSP setting value 821. The SSP setting priority 831 policy may set to reflect the requirements of a user equipment manufacturer or SSP manufacturer. Particularly, for the case of a Telecom bundle, the number of Telecom bundles capable of concurrent enabling may be limited by the SSP setting value according to the modern capability of a communication modem of a user equipment SoC to which the SSP belongs. The SPB setting priority 832 policy may include a method of determining a final concurrent enabling limit value 842 to be a minimum bundle concurrent enabling limit value $N_{Bun}$. The SPB setting priority 832 policy may be used to reflect a request to set a final concurrent enabling limit value by using a bundle concurrent enabling limit value according to a degree that a service provider (Service Provider) that provides a bundle relies on a user equipment in which a bundle is installed. The minimum values 833 and 834 policy may include a method of determining final concurrent enabling limit values 843 and 844 to be a minimum value between an SSP setting value Nssp and the minimum bundle concurrent enabling limit value $N_{Bun}$.

Figure 9:
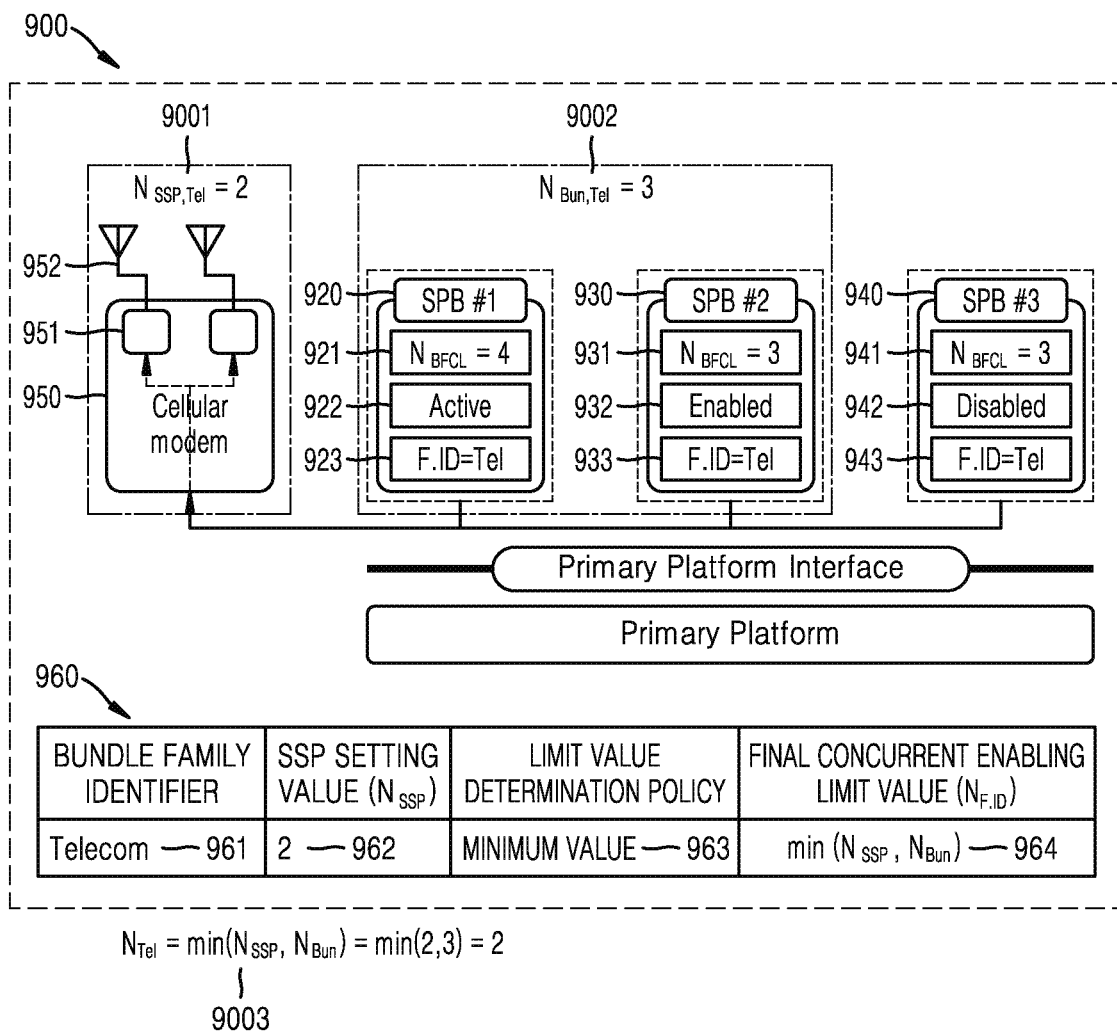
FIG. 9 is a view illustrating a bundle concurrent enabling limit value, a state (SPB state), and a bundle family identifier (SPB Family Identifier) set in a bundle with respect to a specific bundle family identifier set in an SSP of a user equipment, and describing a process of determining a final concurrent enabling limit value by a parameter set in an in-SSP bundle concurrent enabling setting table managed in the SSP, according to an embodiment of the disclosure.

FIG. 9 is a view illustrating a bundle concurrent enabling limit value, a state (SPB state), and a bundle family identifier (SPB Family Identifier) set in a bundle with respect to a specific bundle family identifier set in an SSP of a user equipment, and describing a process of determining a final concurrent enabling limit value by a parameter set in an in-SSP bundle concurrent enabling setting table managed in the SSP, according to an embodiment of the disclosure.

Particularly, FIG. 9 illustrates an example in which the final concurrent enabling limit value of a Telecom bundle family identifier is determined by bundles 920, 930, and 940 having Telecom bundle family identifiers 923, 933, and 943 of the bundles installed in the SSP and an in-SSP bundle concurrent enabling setting table 960 set in the SSP.

A communication modem 950 of FIG. 9 may be a modern of a SoC 900 to which SSP belongs. Furthermore, the communication modern 950 may be used by the Telecom bundles 920, 930, and 940 in the SSP. An SSP setting value 962 corresponding to a Telecom bundle family identifier 961 of the in-SSP bundle concurrent enabling setting table 960 may be determined depending on baseband performance, antenna performance, and the like. For example, the SSP setting value 962 may be determined by the number of cellular basebands, the number of antennas 952, other communication capability, or other factors to consider, which are supported by the communication modem 950. The disclosure is not limited thereto.

According to FIG. 9, operation 9001 shows an example in which the SSP setting value of a Telecom bundle determined by the number of the antennas 952, the number of cellular basebands 951, other communication capability, or the above-described other factors to consider of the communication modem 950 is determined to be the SSP setting value 962 corresponding to the Telecom bundle family identifier of the in-SSP bundle concurrent enabling setting table 960.

According to FIG. 9, in operation 9002, the minimum bundle concurrent enabling limit value of a Telecom family identifier is determined to be 3 by bundle concurrent enabling limit values 921 and 931 of the bundles 920 and 930 in an active state or an enabling state of the Telecom bundles 920, 930, and 940. In FIG. 9, a bundle concurrent enabling limit value 941 set the Telecom bundle 940 in a disabled state is not taken into consideration in operation 9002.

According to operation 9003 of FIG. 9, a final concurrent enabling limit value 964 of the Telecom bundle may be determined may be determined by the in-SSP bundle concurrent enabling setting table 960, the SSP setting value 962 determined in operation 9001, and the minimum bundle concurrent enabling limit value of the Telecom bundle determined in operation 9002. According to operation 9003, the final concurrent enabling limit value 964 of the Telecom family identifier may be determined with reference to a limit value determination policy 963 corresponding to the Telecom family identifier of the in-SSP bundle concurrent enabling setting table 960. Operation 9003 of FIG. 9 shows an example in which the final concurrent enabling limit value of the Telecom is set to be 2 based on the SSP setting value 962 corresponding to the Telecom family identifier of the in-SSP bundle concurrent enabling setting table 960, the limit value determination policy 963, and a minimum bundle concurrent enabling limit value $N_{Bun,Tel}$ of Telecom determined in operation 9002.

Figure 10:
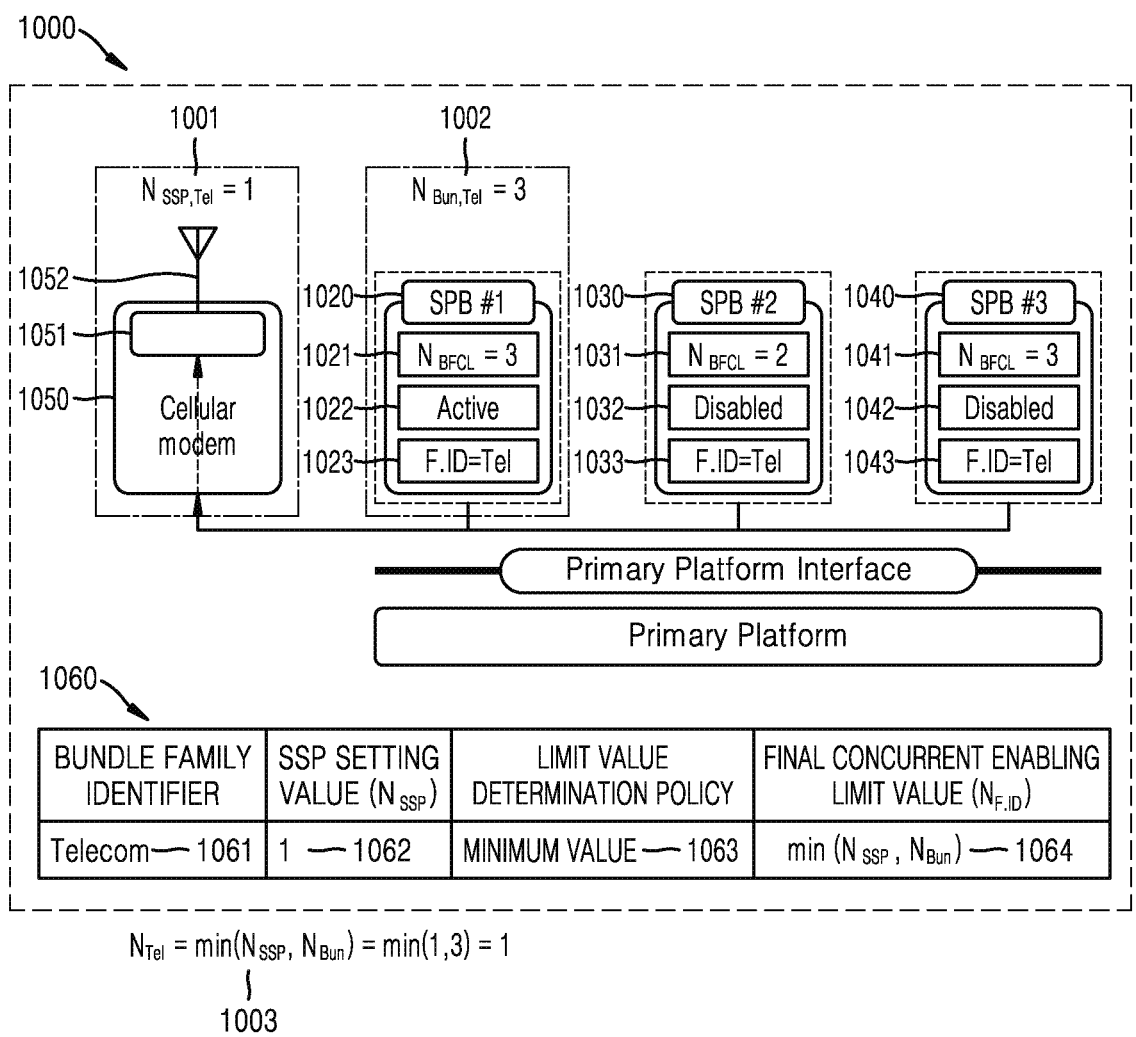
FIG. 10 is a view illustrating a bundle concurrent enabling limit value, a state (SPB state), and a bundle family identifier (SPB Family Identifier) set in a bundle with respect to a specific bundle family identifier set in an SSP of a user equipment, and describing a process of determining a final concurrent enabling limit value by a parameter set in an in-SSP bundle concurrent enabling setting table managed in the SSP, according to an embodiment of the disclosure.

FIG. 10 is a view illustrating a bundle concurrent enabling limit value, a state (SPB state), and a bundle family identifier (SPB Family Identifier) set in a bundle with respect to a specific bundle family identifier set in an SSP of a user equipment, and describing a process of determining a final concurrent enabling limit value by a parameter set in an in-SSP bundle concurrent enabling setting table managed in the SSP, according to an embodiment of the disclosure.

Particularly, FIG. 10 illustrates an example in which the final concurrent enabling limit value of the Telecom bundle family identifier is determined by bundles 1020, 1030, and 1040 having Telecom bundle family identifiers 1023, 1033, and 1043 of the bundles installed in the SSP and an in-SSP bundle concurrent enabling setting table 1060 set in the SSP.

Operation 1001 of FIG. 10 shows an example in which the SSP setting value of the Telecom bundle is set to be 1 according to the number (or performance) of antennas 1052 of a communication modem 1050 and the performance (or number) of cellular basebands 1051. The SSP setting value of the Telecom bundle determined in operation 1001 of FIG. 10 may be the same as an SSP setting value 1062 corresponding to a Telecom family identifier 1061 of the in-SSP bundle concurrent enabling setting table 1060.

In FIG. 10, operation 1002 shows an example in which the minimum bundle concurrent enabling limit value of the Telecom family identifier is determined to be 3 by a bundle concurrent enabling limit value 1021 of the bundle 1020 in an active state or an enabling state of the Telecom bundles 1020, 1030, and 1040. According to FIG. 10, bundle concurrent enabling limit values 1041 and 1042 set in the Telecom bundles 1030 and 1040 in a disabled state are not taken into consideration in operation 1002.

According to operation 1003 of FIG. 10, a final concurrent enabling limit value 1064 of the Telecom bundle may be determined by the in-SSP bundle concurrent enabling setting table 1060, the SSP setting value 1062 determined in operation 1001, and a concurrent enabling limit value of the Telecom bundle determined in operation 1002. According to operation 1003, the final concurrent enabling limit value 1064 of the Telecom family identifier may be determined by referring to a limit value determination policy 1063 corresponding to the Telecom family identifier of the in-SSP bundle concurrent enabling setting table 1060. Operation 1003 of FIG. 10 shows an example in which the final concurrent enabling limit value of is set to be 1 based on the SSP setting value 1062 corresponding to the Telecom family identifier of the in-SSP bundle concurrent enabling setting table 1060, the limit value determination policy 1063, and the minimum bundle concurrent enabling limit value $N_{Bun,Tel}$ of the Telecom determined in operation 1002.

Figure 11:
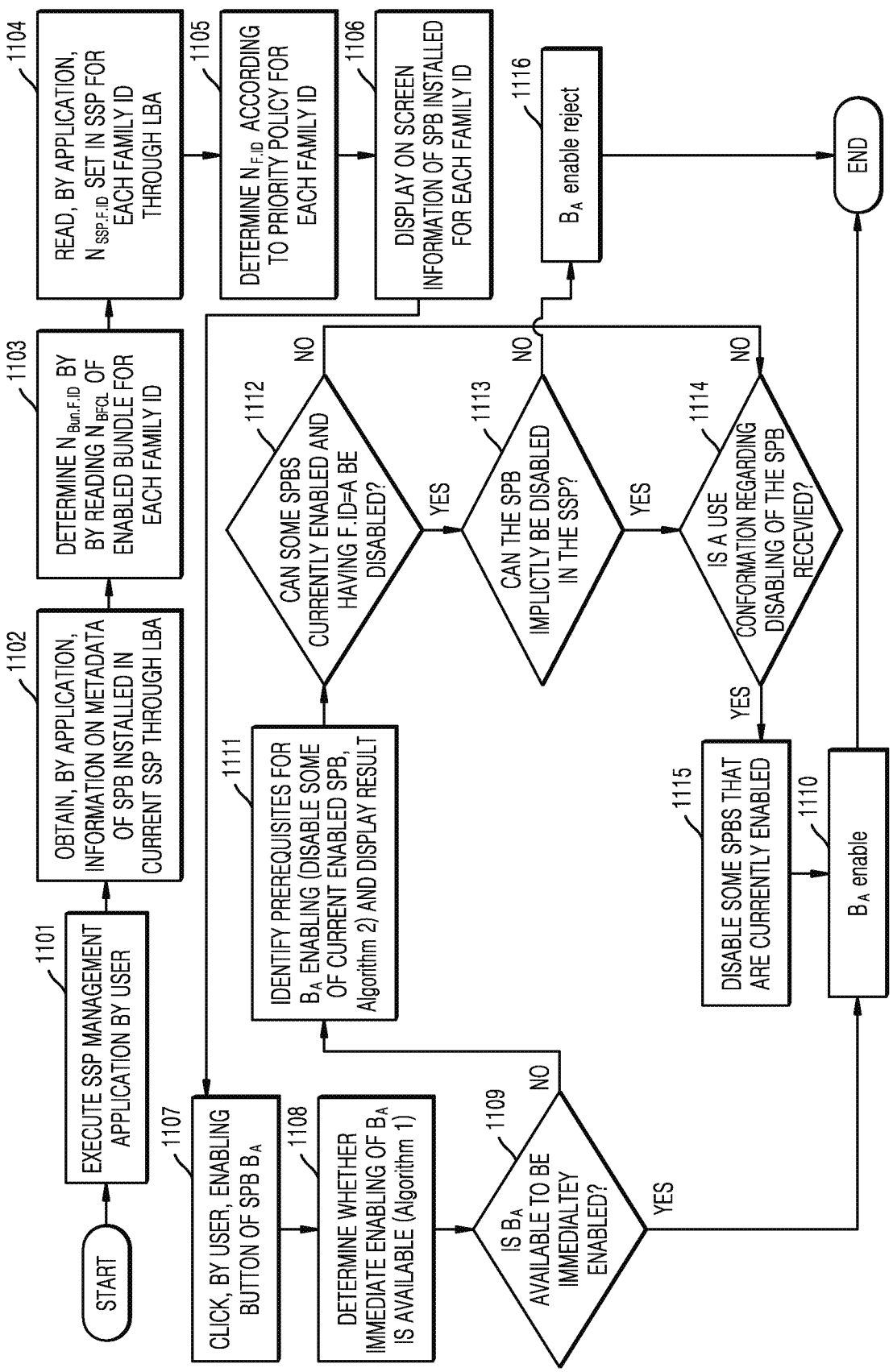
FIG. 11 is a view illustrating information of a bundle installed by executing a user application by a user to manage a bundle set in an SSP of a user equipment user, and an operation procedure among a user application, a local bundle assistant, and an SSP in a process of enabling a bundle, according to an embodiment of the disclosure.

FIG. 11 is a view illustrating information of a bundle installed by executing a user application by a user to manage a bundle set in an SSP of a user equipment user, and an operation procedure among a user application, a local bundle assistant, and an SSP in a process of enabling a bundle, according to an embodiment of the disclosure.

Referring to FIG. 11, in operation 1101, a user may manage an enabling state of a bundle installed in the SSP through a user equipment application (SSP management application) that provides a user interface of the SSP. In operation 1101, a user equipment manufacturer having a right to control access of the SSP may provide an SSP management application.

When a user executes an SSP management application in operation 1101, in operation 1102, the SSP management application may obtain and process information of a bundle installed in an SSP through the LBA of a user equipment and then provide useful information to the user. In operation 1102, a method of obtaining information of the bundle installed in the SSP by the LBA may be metadata (SPB metadata) of the bundle managed in the SSP. In operation 1102, another method of obtaining information of the bundle installed in the SSP by the LBA may be called, by the LBA, from a value obtained by storing and managing metadata of the bundle at an installation thereof.

In operation 1103, the SSP management application may read a bundle concurrent enabling limit value set in an enabled bundle for each bundle family identifier (SPB Family Identifier) and calculate a minimum value of the read values. In operation 1103, the calculation of the bundle concurrent enabling limit value for each bundle family identifier (SPB Family Identifier) may be performed not only in the SSP management application, but also in the SSP or LBA.

In operation 1104, the SSP management application may read an SSP setting value for each bundle family identifier the in-SSP bundle concurrent enabling setting table set in the SSP through the LBA. In operation 1104, when there is no change in the SSP setting value, the SSP management application may include a method of reading, by the LBA, an SSP setting value for each bundle family identifier from the in-SSP bundle concurrent enabling setting table, which is separately managed after being previously read.

In operation 1105, the SSP management application may calculate a final concurrent enabling limit value for each bundle family identifier. In operation 1105, to calculate the final concurrent enabling limit value, the SSP management application may use the minimum bundle concurrent enabling limit value for each bundle family identifier obtained in operation 1103 and the SSP setting value for each bundle family identifier obtained in operation 1004. Operation 1105 may be performed not only in the SSP management application, but also in the LBA.

In operation 1106, the SSP management application may show a final concurrent enabling limit value for each bundle family identifier to a user.

In operation 1107, the user may perform an operation to enable a target bundle BA through the SSP management application.

In operation 1108, the SSP management application, LBA, or SSP may determine a possibility of immediate enabling of the target bundle BA. In operation 1108, the immediate enabling may mean that the target bundle BA may be enabled without disabling any other bundle(s) in an enabling state in the SSP.

In operation 1108, an algorithm (Algorithm 1) for determining a possibility of the immediate enabling of the target bundle $B_A$ may be performed by the following method. When there is no bundle in an enabling state or an active state among the bundles having the same bundle family identifier as that of the target bundle $B_A$, the target bundle $B_A$ may be immediately enabled. When there is a bundle in an enabling state or an active state among the bundles having the same bundle family identifier as that of the target bundle $B_A$, the number of bundles in an enabling state or an active state among the bundles having the same bundle family identifier as that of the target bundle B is $n_{\{A/E\},A}$. It is assumed that the obtained minimum concurrent enabling limit value in operation 1103 is $N_{Bun,A}$, the obtained SSP setting value in operation 1104 is $N_{ssp,A}$, and the obtained final concurrent enabling limit value in operation 1105 is $N_A$. The bundle concurrent enabling limit value set in the target bundle $B_A$ is $N_{BFCL}(B_A)$. When $N_A = N_{Bun,A}$ or $N_A = \min(N_{Bun,A}, N_{ssp,A})$ and a condition that $(n_{\{A/B\},A}+1 \leq N_A = \min(N_A, N_{BFCL}(B_A)))$ is satisfied, the target bundle $B_A$ may be determined to be possibly immediately enabled. When $N_A = N_{ssp,A}$, $(n_{\{A/E\},A}+1 \leq N_A)$, the target bundle $B_A$ may be determined to be possibly immediately enabled. Otherwise, the target bundle $B_A$ may be determined not to be possibly immediately enabled.

In operation 1109, when the immediate enabling of the target bundle $B_A$ is available, operation 1110 may be performed. Operation 1110 may include a method of enabling, by the SSP management application, the target bundle BA through the LBA.

In operation 1109, when the immediate enabling of the target bundle $B_A$ is unavailable, operation 1111 may be performed. Operation 1111 is to check prerequisites for the enabling of the target bundle $B_A$ when the target bundle $B_A$ is unavailable to be immediately enabled. In operation 1111, the operation of checking prerequisites for the enabling of the target bundle $B_A$ may include an operation of disabling some of the bundle in an enabling state having the same bundle family identifier as the target bundle $B_A$. In operation 1111, the SSP management application may include a method of providing a user with a result of the identification of the prerequisites for the enabling of the enabling of the target bundle $B_A$.

In operation 1111, an algorithm (Algorithm 2) for checking prerequisites for the enabling of the target bundle $B_A$ may be performed by the following method. First, among the bundles having the same bundle family identifier as that of the target bundle BA, the number of bundles in an enabling state or an active state is assumed to be $n_{\{A/E\},A}$. It is assumed that the obtained minimum concurrent enabling limit value in operation 1103 is $N_{Bun,A}$, the obtained SSP setting value in operation 1104 is $N_{ssp,A}$, and the obtained final concurrent enabling limit value in operation 1105 is $N_A$. The bundle concurrent enabling limit value sent in the target bundle BA is assumed to be $N_{BFCL}(B_A)$. It is assumed that a list of bundles in an enabling state or an active state among the bundles having the same bundle family identifier as that of the target bundle $B_A$ is $B = \{B_1, B_2, B_3, \ldots, B_{n\{A/E\}A,}\}$. Assuming that $N_{BFCL}$ of Bi(i∈1, 2, \ldots, $n_{\{A/E\},A}$) is defined to be $N_{BFCL}(B_i)$ and arranged such that $N_{BFCL}(B_1) \leq N_{BFCL}(B_2) \leq \ldots \leq N_{BFCL}(B_{n\{A/E\},A})$, the smallest value among k's meeting a condition that $N_{BFCL}(B_A) \leq N_{BFCL}(B_k)$ is assigned to be $k_{min}$. When $N_A = N_{ssp,A}$, the target bundle $B_A$ is determined to be enabled after at least one of bundles belonging to a bundle list B is disabled. When $N_A = N_{Bun,A}$ or $N_A = \min(N_{Bun,A}, N_{ssp,A})$, the target bundle $B_A$ is determined to be enabled after at least one bundle of $B_1, B_2, B_3, \ldots, B_{kmin}$ is disabled. When $N_A = N_{Bun,A}$ or $N_A = \min(N_{Bun,A}, N_{ssp,A})$ and also none of $B_1, B_2, B_3, \ldots, B_{kmin}$ is disabled, the target bundle $B_A$ is determined to be enabled when at least two or more bundles of $B_{kmin+1}, B_{kmin+1}, B_{n\{A/E\},A}$ is disabled.

In operation 1112, for the enabling of the target bundle $B_A$, it may be determined whether it is available to perform an operation of disabling some of enabled bundles having the same bundle family identifier like the target bundle $B_A$. In operation 1112, when it is unavailable to perform the operation of disabling some of enabled bundles having the same bundle family identifier like the target bundle $B_A$, the operation of the enabling of the target bundle $B_A$ may be rejected in operation 1116.

When the operation of disabling some of enabled bundles having the same bundle family identifier like the target bundle $B_A$ is available in operation 1112, whether implicitly disabling a bundle to be disabled is available may be determined in operation 1113. The implicitly disabling of a bundle is one of instructions transmitted from the LBA to the SSP and may mean instructions to enable a target bundle and simultaneously disable other bundle(s). When the implicitly disabling of a bundle to be disabled for the enabling of the target bundle $B_A$ is unavailable in operation 1113, the enabling of the target bundle $B_A$ operation may be rejected in operation 1116.

When he implicitly disabling of a bundle to be disabled for the enabling of the target bundle $B_A$ is available in operation 1113, a user may be requested to check the disabling operation of a bundle to be implicitly disabled in operation 1114. When a user does not agree with the disabling operation of a bundle to be implicitly disabled in operation 1114, the enabling operation of the target bundle $B_A$ may be rejected in operation 1116.

In operation 1114, when a use agrees with the implicitly disabling of a bundle to be disabled for the enabling of the target bundle $B_A$, the disabling of a bundle may be performed in operation 1115. In operation 1115, bundle disabling request commands may be generated in the LBA and transmitted to the SSP. In operation 1115, after the implicitly disabling of a bundle to be disabled is performed for the enabling of the target bundle $B_A$, the enabling of the target bundle $B_A$ may be performed in operation 1110.

Figure 12:
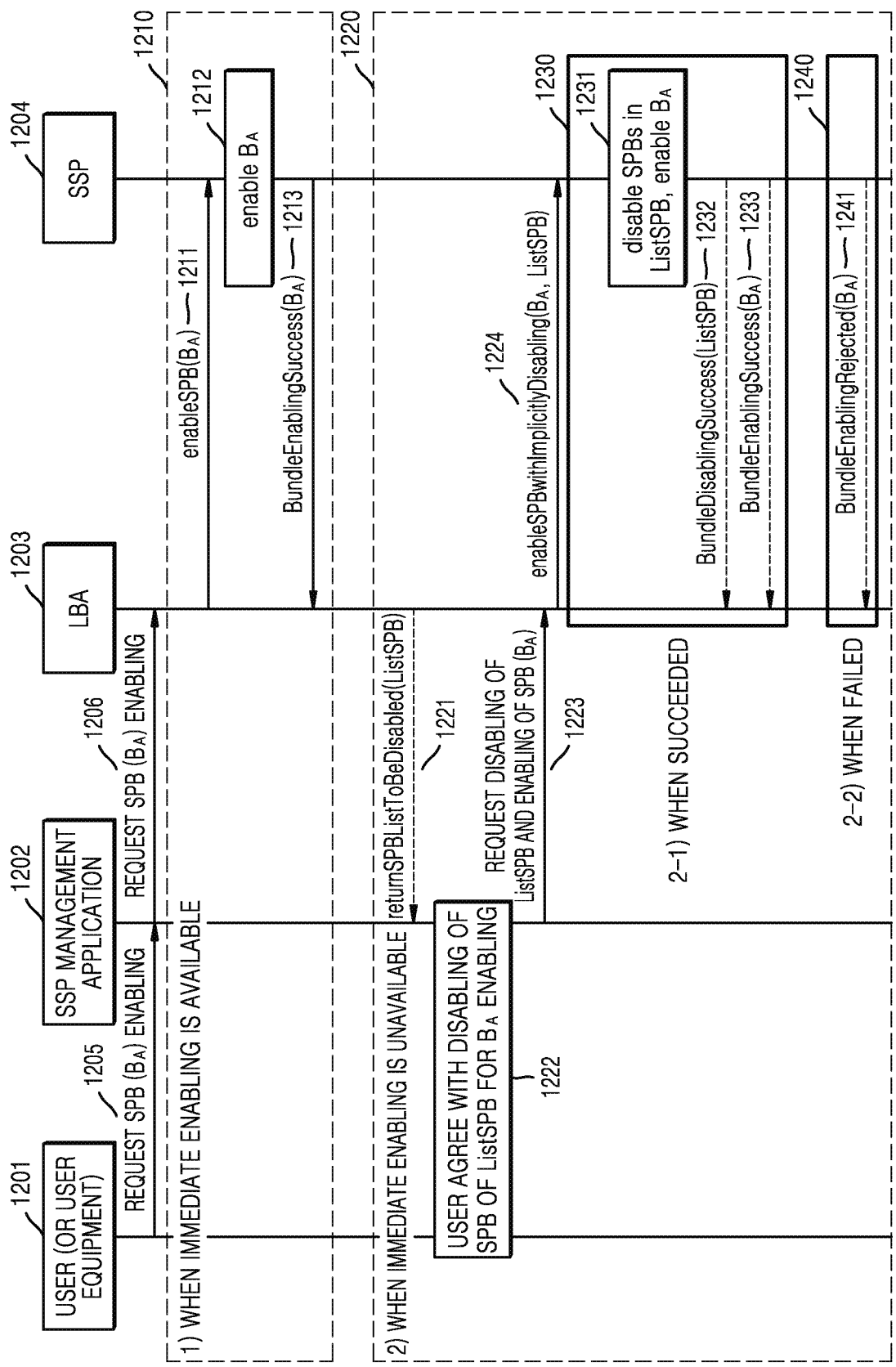
FIG. 12 is a view illustrating a procedure of enabling a bundle, or disabling some bundles and then enabling an appropriate bundle when there is a user input to enable a bundle set in an SSP of a user equipment, according to an embodiment of the disclosure.

FIG. 12 is a view illustrating a procedure of enabling a bundle, or disabling some bundles and then enabling an appropriate bundle when there is a user input to enable a bundle set in an SSP of a user equipment, according to an embodiment of the disclosure.

According to FIG. 12, in operation 1205, a user 1201 may request the enabling of the target bundle BA that is currently in a disabled state through an SSP management application 1202. In operation 1205, the SSP management application 1202 that receives the request of the enabling of the target bundle BA from the user 1201 may request an LBA 1203 for the enabling of the target bundle BA in operation 1206.

The LBA 1203 may transmit enabling instructions of the target bundle $B_A$ to an SSP 1204 in operation 1211.

According to FIG. 12, in a situation 1210 in which the immediate enabling of the target bundle $B_A$ is available, the SSP 1204 that received the enabling instructions of the target bundle $B_A$ in operation 1211 may enable the target bundle $B_A$ in operation 1212.

After the target bundle BA is enabled in operation 1212, the SSP 1204 may transmit to the LBA 1203 a message that the target bundle $B_A$ is normally enabled According to FIG. 12, in a situation 1220 in which the immediate enabling of the target bundle $B_A$ is unavailable, the LBA 1203 may transmit a list (ListSPB) of bundles to be disabled for the enabling of the target bundle $B_A$ to the SSP management application 1202 in operation 1221.

In operation 1222, the SSP management application 1202 may notify the user 1201 of the list (ListSPB) of bundles to be disabled received in in operation 1221 the user 1201 and may request an agreement for performing a disabling operation.

After receiving an agreement of the user 1201 in operation 1222, in operation 1223, the SSP management application 1202 may request the LBA 1203 for the enabling of the target bundle $B_A$ and the disabling of the list (ListSPB) of bundles to be disabled. The LBA 1203 may request the SSP 1204 for the enabling of the target bundle $B_A$ and the disabling of the list (ListSPB) of bundles to be disabled in operation 1224.

According to FIG. 12, in a situation 1230 in which the enabling of the target bundle BA is available after the disabling of the list (ListSPB) of bundles to be disabled, the SSP 1204 may perform the enabling of the target bundle BA after the disabling of the list (ListSPB) of bundles to be disabled in operation 1231. After performing an operation in operation 1231, in operation 1232, the SSP 1204 may transmit to the LBA 1203 a message that the disabling of the list (ListSPB) of bundles to be disabled has normally been performed. After performing an operation in operation 1231, in operation 1233, the SSP 1204 may transmit to the LBA 1203 a message that the enabling of the target bundle BA has normally been performed.

According to FIG. 12, in a situation 1240 in which the enabling of the target bundle $B_A$ is unavailable after the disabling of the list (ListSPB) of bundles to be disabled, the SSP 1204 may transmit to the LBA 1203 a message indicating a failure of the enabling of the target bundle $B_A$, in operation 1241.

Although not illustrated in the drawings, in the situation 1220 in which the immediate enabling of the target bundle $B_A$ is unavailable, before requesting the enabling of the target bundle $B_A$, the user 1201 may perform an operation of requesting disabling of bundles belonging to the list (ListSPB) of bundles to be disabled, through the SSP management application 1202, and then may perform operation 1205.

Figure 13:
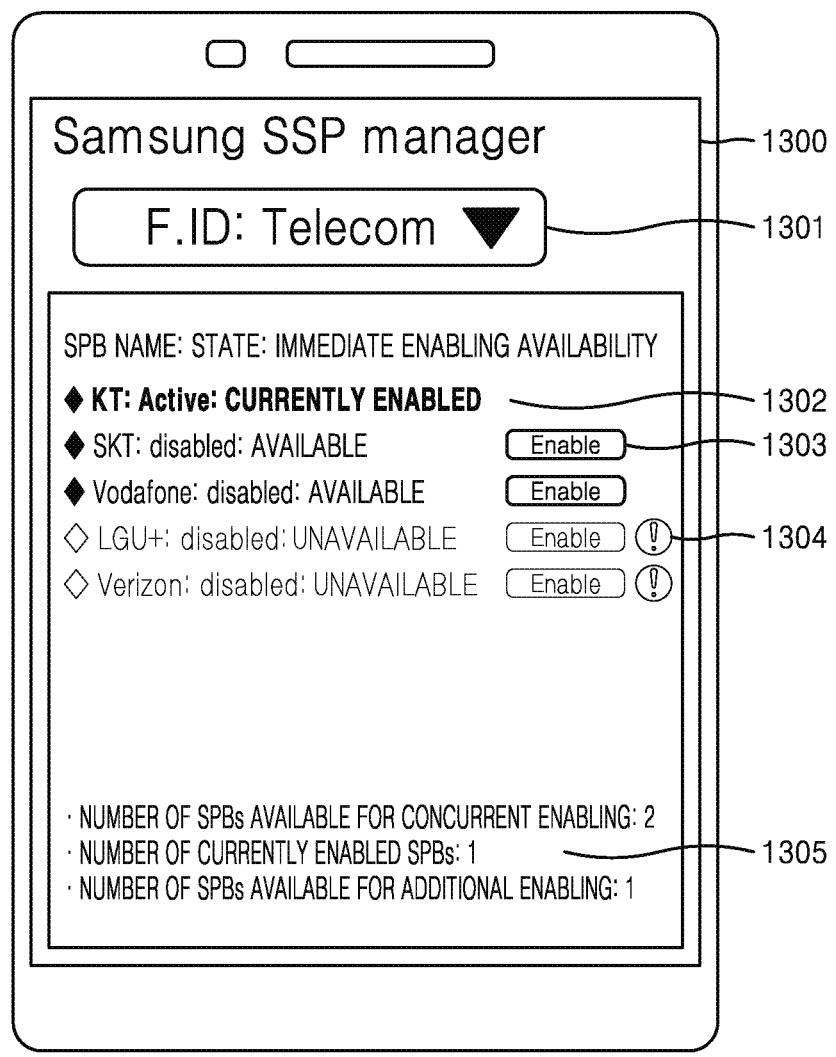
FIG. 13 is a view illustrating a list of bundles set in an SSP of a user equipment and a user application and a user interface for managing enabling/disabling, according to an embodiment of the disclosure.

FIG. 13 is a view illustrating a list of bundles set in an SSP of a user equipment and a user application and a user interface for managing enabling/disabling, according to an embodiment of the disclosure.

According to FIG. 13, a user interface of an SSP management application 1300 may include bundle family a tab 1301 to select an identifier. The SSP management application 1300 may display information 1302 of an installed bundle on a screen. The information 1302 of an installed bundle may include the name of a bundle, the state of a bundle, and a possibility of immediate enabling of a bundle. The SSP management application 1300 may display on the screen a button 1303 capable of enabling the bundle in a disabled state. The SSP management application 1300 may display, on the screen, a button 1305 for requesting additional information about a bundle, of which the immediate enabling is unavailable, among the bundles in a disabled state. The SSP management application 1300 may display, on the screen, information 1305 related to the number of bundles with respect to the bundle family identifier currently set by the tab 1301. The information 1305 related to the number of bundles may include the final concurrent enabling limit value, the number of currently enabled bundles, and the number of bundles to be additionally enabled.

Figure 14:
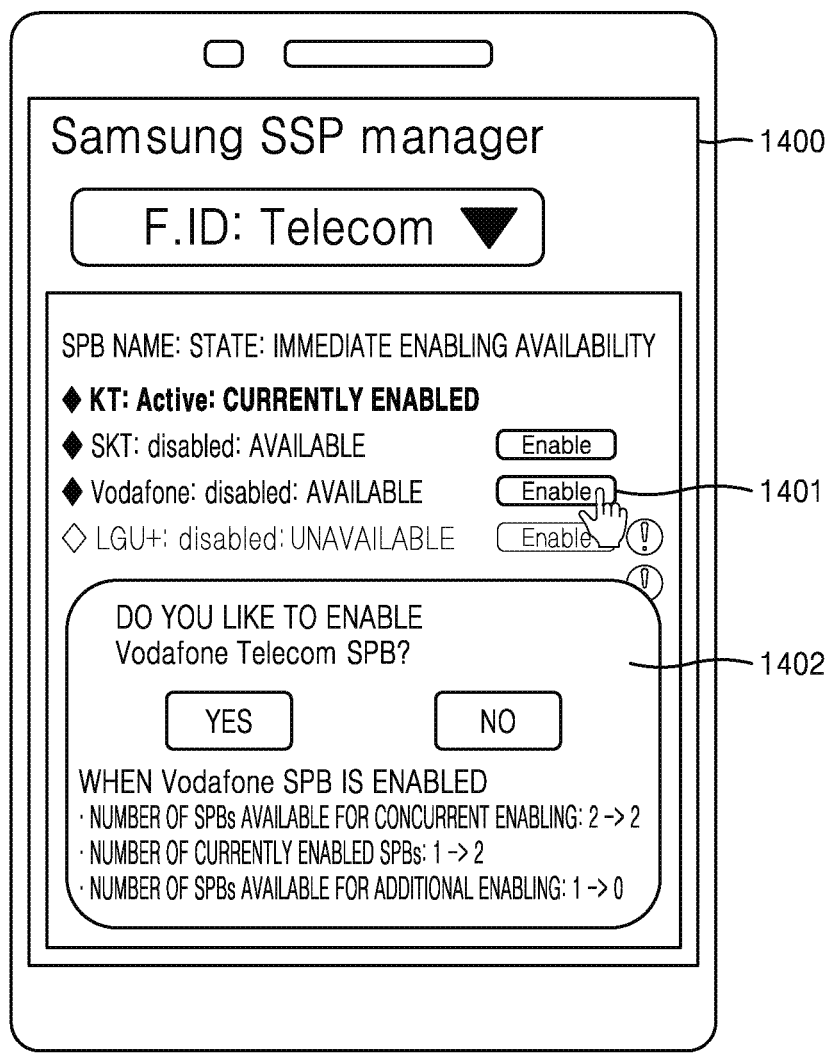
FIG. 14 is a view illustrating a list of bundles set in an SSP of a user equipment and a user application and a user interface for managing enabling/disabling, according to another embodiment of the disclosure.

FIG. 14 is a view illustrating a list of bundles set in an SSP of a user equipment and a user application and a user interface for managing enabling/disabling, according to another embodiment of the disclosure.

According to FIG. 14, when a user clicks an enabling button 1401 of a bundle, an SSP management application 1400 may display, on a screen, a window 1402 that provides a user's confirmation and additional information. The window 1402 providing the user's confirmation and additional information may include information requesting a user's confirmation regarding enabling of a bundle. The window 1402 providing the user's confirmation and additional information may include a change of information related to the number of bundles during additional enabling of a bundle. A change of information related to the number of bundles may include a change in the final concurrent enabling limit value, a change in the number of currently enabled bundles, and a change in the number of bundles to be additionally enabled.

Figure 15:
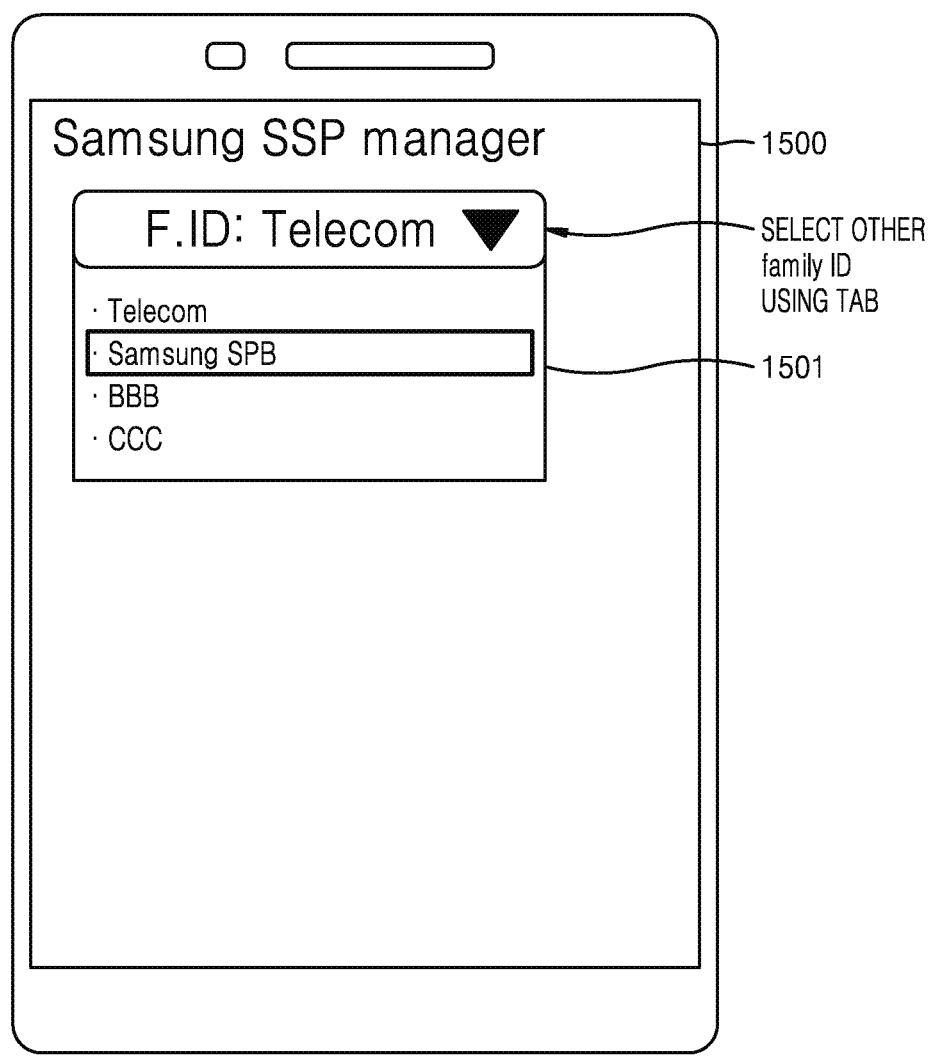
FIG. 15 is a view illustrating a list of bundles set in an SSP of a user equipment and a user application and a user interface for managing enabling/disabling, according to another embodiment of the disclosure.

FIG. 15 is a view illustrating a list of bundles set in an SSP of a user equipment and a user application and a user interface for managing enabling/disabling, according to another embodiment of the disclosure.

According to FIG. 15, an SSP management application 1500 may include a window 1501 for selecting a bundle family identifier.

Figure 16:
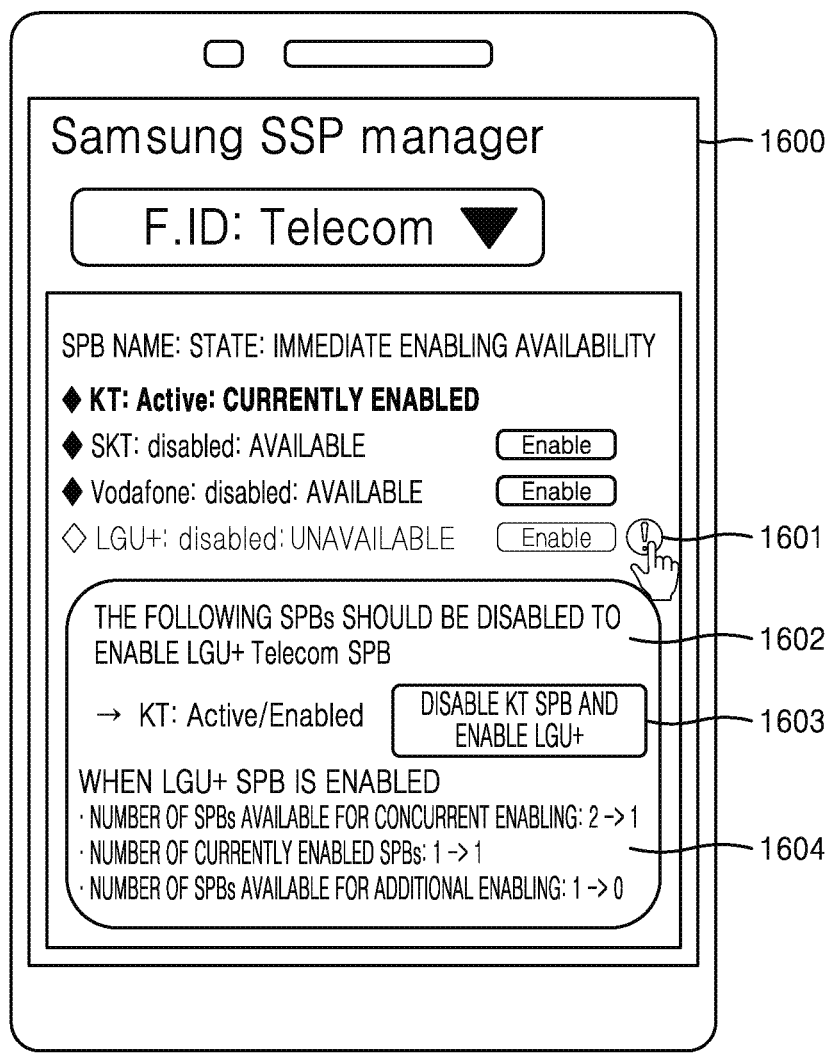
FIG. 16 is a view illustrating a list of bundles set in an SSP of a user equipment and a user application and a user interface for managing enabling/disabling, according to another embodiment of the disclosure.

FIG. 16 is a view illustrating a list of bundles set in an SSP of a user equipment and a user application and a user interface for managing enabling/disabling, according to another embodiment of the disclosure.

According to FIG. 16, when a user clicks a button 1601 for providing additional information to enable a bundle of which immediate enabling is unavailable, an SSP management application 1600 may display additional information 1602 on a screen. The additional information 1602 may include information about a bundle to be disabled for the enabling of the bundle. The additional information 1602 may include a button 1603 for enabling a bundle after disabling the bundle to be disabled for the enabling of the bundle. The additional information 1602 may include a change 1604 of information related to the number of bundles regarding the bundle family identifier after the disabling and enabling of bundles by the button 1603.

According to various embodiments of the disclosure, a user equipment may determine a possibility of enabling of a specific bundle according to the final concurrent enabling limit value set in the SSP with respect to a specific bundle family identifier. Furthermore, the number of bundles to be concurrently enabled for each bundle family identifier in the SSP of a user equipment may be limited and managed. Furthermore, according to various embodiments of the disclosure, the number of bundles having a specific bundle family identifier may be limited and managed by setting one of the bundle concurrent enabling limit value set in a bundle and the concurrent enabling limit value set in a user equipment to be the final concurrent enabling limit value according to the limit value determination policy set in a user equipment. Furthermore, for the enabling of a specific bundle of which enabling is unavailable according to the final concurrent enabling limit value, other bundle(s) in an enabling state is disabled and then a specific bundle may be enabled.

Figure 17:
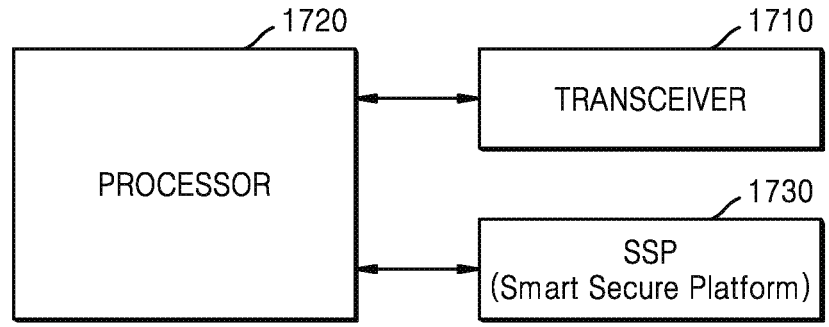
FIG. 17 is a view illustrating a configuration of a user equipment, according to an embodiment of the disclosure.

FIG. 17 is a view illustrating a configuration of a user equipment, according to an embodiment of the disclosure.

As illustrated in FIG. 17, a user equipment may include a transceiver (Transceiver) 1710 and at least one processor 1720. Furthermore, a user equipment may include an SSP 1730. For example, the SSP 1730 may be inserted into the user equipment, and may be included in the user equipment. The at least one processor 1720 may be called a controller.

However, the configuration of the user equipment not limited to the illustration of FIG. 17, and the user equipment may include more or less constituent elements than the constituent elements illustrated in FIG. 17. According to one embodiment, the transceiver 1710 the at least one processor 1720, and a memory (not shown) may be implemented in the form of one chip (Chip). Furthermore, when the SSP 1730 is included in the user equipment, including the SSP 1730 may be implemented in the form of one ship. According to one embodiment, the transceiver 1710 may transmit and receive a signal, information, data, and the like with bundle management server according to various embodiments of the disclosure. The transceiver 1710 may be configured with an RF transmitter for up-converting and amplifying the frequency of a transmitted signal, an RF receiver for low-noise amplifying a received signal and down converting the frequency of the signal, and the like. However, this is merely one embodiment of the transceiver 1710, and constituent elements of the transceiver 1710 are not limited to the RF transmitter and the RF receiver. Furthermore, the transceiver 1710 may receive a signal through a wireless channel and output the received signal to the at least one processor 1720, and may transmit a signal output from the at least one processor 1720 through the wireless channel.

The at least one processor 1720 and the SSP 1730 is a constituent element to generally control the user equipment. The at least one processor 1720 and the SSP 1730 may control an overall operation of the user equipment as the described above, according to various embodiments of the disclosure. At this time, each of the at least one processor 1720 and the SSP 1730 may individually control the operation of a user equipment, or the at least one processor 1720 and the SSP 1730 in cooperation with each other may control the operation of a user equipment.

Furthermore, according to one embodiment, the at least one processor 1720 and/or the SSP 1730 may control such that a minimum bundle concurrent enabling limit value that is a minimum value of the concurrent enabling limit values is checked for each of enabled bundles installed in a user equipment and having the same bundle family identifier, a concurrent enabling limit value is checked for each enable bundles having the same bundle family identifier based on the limit value determination policy of a user equipment, and a final concurrent enabling limit value is set through comparison between the minimum bundle concurrent enabling limit value and the concurrent enabling limit value.

According to an embodiment of the disclosure, the at least one processor 1720 and/or the SSP 1730 may check a bundle concurrent enabling limit value of a bundle installed in a user equipment, a concurrent enabling limit value of bundles installed in a user equipment and having a specific bundle family identifier, and a minimum value of the concurrent enabling limit values of enabled bundles installed in a user equipment and having a specific bundle family identifier, and may set the minimum value of the concurrent enabling limit values of enabled bundles installed in a user equipment and having a specific bundle family identifier to be a minimum bundle concurrent enabling limit value of the bundle family identifier and set a concurrent enabling limit value for each bundle family identifier in user equipment. Furthermore, the at least one processor 1720 and/or the SSP 1730 may check a concurrent enabling limit value for each bundle family identifier in a user equipment, set the limit value determination policy in a user equipment, check the limit value determination policy in a user equipment, check a concurrent enabling limit value set in a user equipment, calculate a final concurrent enabling limit value of a specific family identifier according to the limit value determination policy, and check a final concurrent enabling limit value of a specific family identifier. Furthermore, the at least one processor 1720 and/or the SSP 1730 may control to determine a possibility of enabling of a bundle by referring to a final concurrent enabling limit value of a family identifier of a certain bundle, determine a possibility of enabling of a specific bundle according to a final concurrent enabling limit value corresponding to a bundle family identifier of the bundle at the enabling request of the bundle, transmit to the SSP instructions to disable other bundle(s) for enabling of a specific bundle, transmit to the SSP instructions to sequentially perform disabling of other bundle(s) and enabling of a specific bundle, display on a screen to a user an enabling state of a bundle installed in the SSP, display on the screen to a user a final concurrent enabling limit value for each bundle family identifier, and perform enabling and disabling of a bundle based on the final concurrent enabling limit value to a user.

According to an embodiment of the disclosure, there may be provided a user equipment including a method of checking a minimum bundle concurrent enabling limit value for each bundle family identifier of a bundle installed in a user equipment, setting a concurrent enabling limit value in the SSP, setting the limit value determination policy in the SSP, calculating a final concurrent enabling limit value, and determining a possibility of enabling of the bundle in a disabled state based on the final concurrent enabling limit value, by the at least one processor 1720 and/or the SSP 1730.

The user equipment may further include a memory (not shown), and may store therein data such as basic programs, application programs, setting information, and the like for the operation of a user equipment. Furthermore, the memory may include at least one storage medium of a flash memory type, a hard disk type, a multimedia card micro type, a card type memory, for example, SD or XD memory, and the like, a magnetic memory, a magnetic disc, an optical disc, random access memory (RAM), static random access memory (SRAM), read-only memory (ROM), programmable read-only memory (PROM), or electrically erasable programmable read-only memory (EEPROM). Furthermore, the processor 1720 may perform various operations by using various programs, contents, data, and the like stored in the memory.

In the above-described embodiments of the disclosure, the constituent elements included in the disclosure are expressed in singular or plural according to the specific embodiment. However, the singular or plural expression is selected appropriately for the presented situation for convenience of explanation, and the disclosure is not limited to the singular or plural constituent elements, and even constituent elements expressed in plural are composed of a single constituent element and vice versa.

In the detailed description of the disclosure, a specific embodiment has been described, but it goes without saying that various modifications are available without departing from the scope of the disclosure. Therefore, the scope of the disclosure should not be limited to the described embodiments, but should be determined by the scope of the claims to be described later as well as those equivalents to the scope of the claims.

Various embodiments of the disclosure and terms used herein are not intended to limit the technology described in the disclosure to a specific embodiment, and should be understood to include various modifications, equivalents, and/or substitutes of the embodiment. In connection with the description of the drawings, similar reference numerals may be used for similar constituent elements. Singular expressions may include plural expressions unless the context clearly indicates otherwise. In the disclosure, the expressions such as "A or B," "at least one of A and/or B," or "at least one of A and/or B" may include all available combinations of items listed together. Terms such as "first" and "second" are used herein merely to describe a variety of constituent elements regardless of an order and/or importance and to distinguish one constituent element from another constituent element, but the constituent elements are not limited by the terms. In the disclosure, when one, e.g., the first, constituent element is referred to as being functionally or communicatively connected to another, e.g., the second, constituent element, it can be directly functionally or communicatively connected to the other constituent element or indirectly functionally or communicatively connected to the other constituent element via other, e.g., the third constituent element.

The term "module" used in various embodiments of the disclosure may denote a unit including one or two or more combinations of, for example, hardware, software, or firmware. The module may be interchangeably used with terms for example, units, logics, logical blocks, components, or circuits. The module may be a minimum unit of a part that is integrally formed or a part thereof and may be a minimum unit performing one or more functions or a part thereof. For example, the module may include an application-specific integrated circuit (ASIC).

Various embodiments of the disclosure may be implemented by software, e.g., a program, including instructions stored in machine-readable storage media, e.g., an internal memory or an external memory. The device is an apparatus capable of calling a stored instruction from a storage medium and operating according to the called instruction, and may include user equipment according to various embodiments. When the instruction is executed by a processor, the processor may perform a function corresponding to the instruction directly or by using other constituent elements under the control of the processor. Instructions may include codes generated or executed by a compiler or interpreter.

A machine-readable storage medium may be provided in the form of a non-transitory storage medium. The being "non-transitory" means that the storage medium does not include a signal and is tangible, but does not distinguish that data is semi-permanently or temporarily stored in the storage medium.

A method according to various embodiments of the disclosure may be provided by being included in a computer program product. The computer program product may be traded as goods between a seller and a buyer. The computer program product may be distributed in the form of a machine-readable storage medium, e.g., a compact disc read only memory (CD-ROM), or online through an application store, e.g., Play Store™. In the case of online distribution, at least a part of the computer program product may be at least temporarily stored or created in a storage medium such as a server of a manufacturer, a server of an application store, or a memory of a relay server.

Each of the constituent elements, e.g., modules or programs, according to various embodiments may be composed of a singular or a plurality of entities, and some sub-constituent elements may be omitted from the above-described sub-constituent elements, or other sub-constituent elements may be further included in various embodiment implemented. May be included in more examples. Alternatively or additionally, some constituent elements, e.g., modules, or programs, may be integrated into one entity, and thus a function that has been performed by each corresponding constituent element prior to the integration may be performed identically or similarly. Operations performed by modules, programs, or other constituent elements according to various embodiments may be sequentially, parallel, repetitively, or heuristically executed, at least some operations may be executed in a different order, omitted, or other operations may be added.

The invention claimed is:

1. A method of managing a bundle installed in a smart secure platform (SSP), the method comprising:

determining a concurrent enabling limit value for a bundle family identifier based on SSP setting information associated with a telecom bundle, wherein the concurrent enabling limit value indicates information to limit a number of telecom bundles in an enabled state or an active state;

identifying a number of enabled bundles; and determining whether to enable a target bundle based on the identified number of the enabled bundles and the concurrent enabling limit value for the bundle family identifier.

2. The method of claim 1, wherein the bundle family identifier comprises a telecom bundle identifier.

3. The method of claim 1, wherein the concurrent enabling limit value is determined based on performance information of a user equipment, and wherein the performance information of the user equipment comprises at least one of antenna performance of a communication modem of the user equipment or performance of a cellular baseband.

4. The method of claim 1, further comprising:

obtaining bundle information in the SSP; and displaying at least one of the number of the enabled bundles, a number of bundles available for additional enabling, or a number of bundles capable of being simultaneously enabled, based on the bundle information and the SSP setting information in the SSP.

5. The method of claim 1, further comprising:

obtaining the SSP setting information associated with the telecom bundle, wherein the SSP setting information associated with the telecom bundle is set in a registry managed by a secondary platform bundle loader (SPBL) of the SSP.

6. The method of claim 1, wherein determining whether to enable the target bundle comprises:

in case that the number of the enabled bundles is less than the concurrent enabling limit value, enabling the target bundle; and in case that the number of the enabled bundles is greater than or equal to the concurrent enabling limit value, identifying that enabling the target bundle is limited by the concurrent enabling limit value.

7. The method of claim 1, further comprising:

identifying the target bundle to enable;

disabling at least one of the enabled bundles; and after disabling the at least one of the enabled bundles, enabling the target bundle.

8. The method of claim 7, wherein the disabling of at least one of the enabled bundles comprises receiving an input to select at least one of the enabled bundles and disabling the at least one bundle selected based on the input.

9. A user equipment for managing a bundle installed in a smart secure platform (SSP), the user equipment comprising:

a transceiver; and a controller coupled to the transceiver and configured to:

determine a concurrent enabling limit value for a bundle family identifier based on SSP setting information associated with a telecom bundle, wherein the concurrent enabling limit value indicates information to limit a number of telecom bundles in an enabled state or an active state, identify a number of enabled bundles, and determine whether to enable a target bundle based on the identified number of the enabled bundles and the concurrent enabling limit value for the bundle family identifier.

10. The user equipment of claim 9, wherein the bundle family identifier comprises a telecom bundle identifier.

11. The user equipment of claim 9, wherein the concurrent enabling limit value is determined based on performance information of a user equipment, and wherein the performance information of the user equipment comprises at least one of antenna performance of a communication modem of the user equipment or performance of a cellular baseband.

12. The user equipment of claim 9, wherein the controller is further configured to:

obtain bundle information in the SSP, and display at least one of the number of the enabled bundles, a number of bundles available for additional enabling, or a number of bundles capable of being simultaneously enabled, based on the bundle information and the SSP setting information in the SSP.

13. The user equipment of claim 9, wherein the controller is further configured to receive an input to select at least one of the enabled bundles and disable the at least one bundle selected based on the input.

14. The user equipment of claim 9, wherein the controller is further configured to obtain the SSP setting information associated with the telecom bundle, wherein the SSP setting information associated with the telecom bundle is set in a registry managed by a secondary platform bundle loader (SPBL) of the SSP.

15. The user equipment of claim 9, wherein the controller is further configured to:

in case that the number of the enabled bundles is less than the concurrent enabling limit value, enable the target bundle, and in case that the number of the enabled bundles is greater than or equal to the concurrent enabling limit value, identify that enabling the target bundle is limited by the concurrent enabling limit value.

16. The user equipment of claim 9, wherein the controller is further configured to:

identify the target bundle to enable, disable at least one of the enabled bundles, and after disabling the at least one of the enabled bundles, enable the target bundle.

\* \* \* \* \*